US010870442B1

(12) United States Patent
Choi

(10) Patent No.: US 10,870,442 B1
(45) Date of Patent: Dec. 22, 2020

(54) CART WITH REMOVEABLE BASKET

(71) Applicant: Warren Won Choi, Los Angeles, CA (US)

(72) Inventor: Warren Won Choi, Los Angeles, CA (US)

( * ) Notice: Subject to any disclaimer, the term of this patent is extended or adjusted under 35 U.S.C. 154(b) by 0 days.

(21) Appl. No.: 16/821,774

(22) Filed: Mar. 17, 2020

Related U.S. Application Data

(63) Continuation of application No. 16/578,200, filed on Sep. 20, 2019, now Pat. No. 10,611,390.

(60) Provisional application No. 62/863,828, filed on Jun. 19, 2019.

(51) Int. Cl.
*B62B 3/02* (2006.01)
*B62B 5/06* (2006.01)

(52) U.S. Cl.
CPC ............ *B62B 3/02* (2013.01); *B62B 5/06* (2013.01); *B62B 2301/044* (2013.01); *B62B 2501/067* (2013.01)

(58) Field of Classification Search
CPC ........................................... B62B 3/02
See application file for complete search history.

(56) References Cited

U.S. PATENT DOCUMENTS

| | | | | |
|---|---|---|---|---|
| 3,118,553 A | * | 1/1964 | Rosenzweig | B62B 3/027 414/469 |
| 4,650,199 A | * | 3/1987 | Rehrig | B62B 3/14 280/33.997 |
| 5,700,021 A | * | 12/1997 | Leatherbury | B62B 3/14 280/47.35 |
| 2011/0036987 A1 | * | 2/2011 | Bartholet | G01T 1/026 250/370.07 |
| 2013/0049311 A1 | * | 2/2013 | Metters | B62B 3/027 280/33.998 |

* cited by examiner

*Primary Examiner* — John D Walters
*Assistant Examiner* — James J Triggs
(74) *Attorney, Agent, or Firm* — Heedong Chae; Lucem, PC

(57) ABSTRACT

A cart including a body that has a frame and a caster, and the frame including first and second bars. The cart further includes a basket, first and second couplers attached to the basket such that the first and second couplers removably couple in a snug fit with either the first and second bars respectively, or the second and first bars respectively. The cart further includes first and second latches attached to the basket such that the first and second latches are constructed to reversibly secure the first and second couplers respectively to either the first bar and the second bar, or the second bar and the first bar, and a latch-connecting means having a first end attached to the first latch and a second end attached to the second latch such that the latch-connecting means permits the second latch to be controlled by the first latch.

20 Claims, 23 Drawing Sheets

CART WITH REMOVEABLE BASKET

CROSS-REFERENCE TO RELATED APPLICATIONS

This application is a continuation application of and claims priority to U.S. non-provisional patent application Ser. No. 16/578,200, filed on Sep. 20, 2019, which claims priority to U.S. provisional patent application No. 62/863,828, filed on Jun. 19, 2019, the disclosures of which are incorporated herein by reference in their entirety.

FIELD OF THE INVENTION

The present invention relates to a cart, and more particularly, a cart with a basket that is removably coupled to a frame to not only change the way the cart is operated but also provide a more convenient cart to use for transporting and/or depositing goods. Additionally, and more particularly, the cart provides additional convenience in terms of storage for later use or transportation of the cart itself, individually or en masse.

Carts are typically used for transporting items from one location to another. Typically, a user brings a cart to a location, collects items desired to be transported, places the items into the cart, pushes or pulls the now-filled cart to the destination, and deposits or transfers the items at the destination by removing the items from the cart. However, the use of a typical cart known in the art is not without difficulties for the user. For example, sometimes unloading a cart can be unnecessarily laborious, as the user is required to use their lower back to bend towards the cart and reach into the cart to remove the transported items from within it. Additionally, carts that transport large loads are often unwieldy for being stored or transported themselves, both situations often requiring cart disassembly, which may be cumbersome and laborious to some users.

SUMMARY OF THE INVENTION

The present invention contrives to solve the disadvantages of the prior art. The present invention is directed to a cart with a basket that is removably coupled to a frame.

An object of the present invention is to provide a cart having a body, a basket, first and second couplers, first and second latches, and a latch-connecting means. The body includes a caster and a frame, wherein the frame includes first and second bars. The first and second couplers are attached to the basket wherein the first and second couplers removably couple in a snug fit with either the first and second bars respectively, or the second and first bars respectively. The first and second latches attach to the basket wherein the first and second latches are constructed to reversibly secure the first and second couplers respectively to either the first bar and the second bar, or the second bar and the first bar. The latch-connecting means include a first end attached to the first latch and a second end attached to the second latch such that the latch-connecting means is between the first and second latches.

Another object of the present invention is to provide a cart having a body, a basket, first and second couplers, and a latch attached to the basket. The body includes a caster and a frame wherein the frame includes first and second bars. The first and second couplers attach to the basket wherein the first and second couplers removably couples in a snug fit with either the first and second bars of the frame respectively, or the second and first bars of the frame respectively. The latch reversibly secures the first coupler to either the first bar or the second bar. The advantages of the present invention are: (1) the ability to easily transport and deposit goods that make up the cart's load; (2) ease of storing the cart, as the basket of the cart can easily be decoupled from the frame, turned upside down, and, with the open end of the basket directed towards the frame, placed atop of the frame for convenient storage (e.g. storage in a vehicle), or vice versa; (3) mass storage of many carts, as the basket can be decoupled from the frame such that the frame can be stowed on top of each other, as can the basket on top of another basket; (4) an opening of the second coupler is angled towards the first coupler such that the second coupler receives the second bar therein and where the first coupler is lowered to the first bar which allows the latch to lock the first coupling to the first bar; (5) the second coupler can adopt many angles for a variety of tasks, particularly if its opening is directed away from the first coupler form a secured pivot point, as this configuration allows the user to unlock the first coupler from the first bar and tip the contents of the basket without fear that the basket will become dislodged from the frame of the cart; (6) ease of coupling/decoupling the basket to/from the frame of the cart; (7) the second coupler can adopt many angles for a variety of tasks, particularly if its opening is directed towards to the first coupler to form a secured pivot point, as this configuration allows the user to place the second coupler to the second bar and allow the first coupler to drop onto the first bar by the basket's own weight such that the locking is semi-automatic; (8) the close fit or snug fit of the first coupler to any of the bars of the cart's frame prevents unwanted jostling of the contents of the basket when the cart is being transported by the user; (9) the close fit or snug fit of the first coupler to any of the bars of the cart's frame together with the length of the first coupler approximating the length of the bar and the width of the first coupler being greater than the width of the bar results in the basket being secured to the frame avoids unwanted jostling and lateral movement of the basket and the contents therein; (10) ease of detaching the basket from the body using an actuating braking mechanism; and (11) a telescoping handle to allow for adjustment of a height of the handle to allow a comfortable height while using the cart as well as making the height of the handle more compact for more convenient storage of the cart.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein.

DETAILED DESCRIPTION EMBODIMENTS OF THE INVENTION

Reference will now be made in detail to the preferred embodiments of the present invention, examples of which are illustrated in the accompanying drawings, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention.

Also, as used in the specification including the appended claims, the singular forms "a", "an", and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about", it will be understood that the particular value forms another embodiment.

Figure 1:
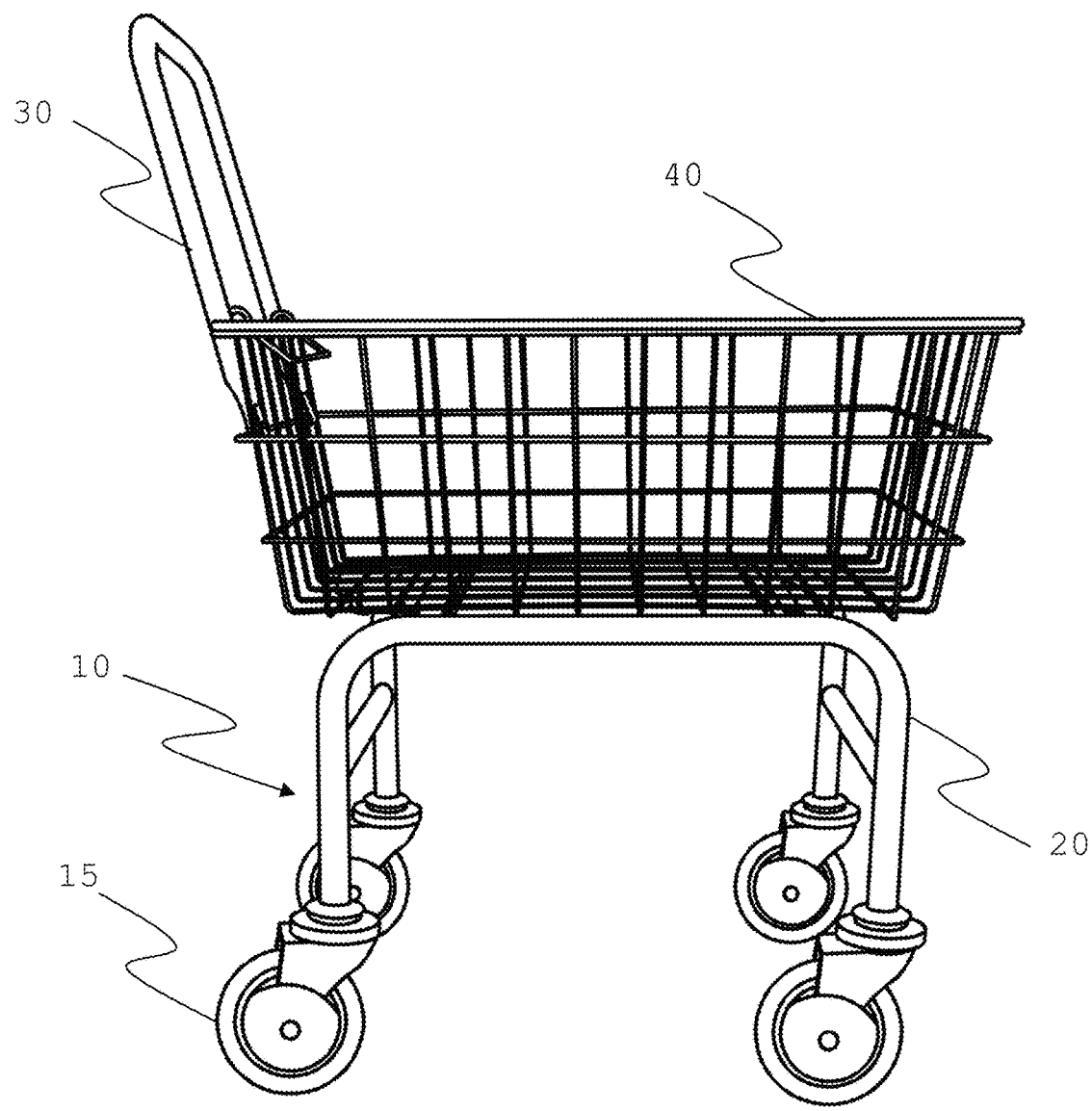
FIG. 1 shows a perspective view of a cart.
Figure 2A:
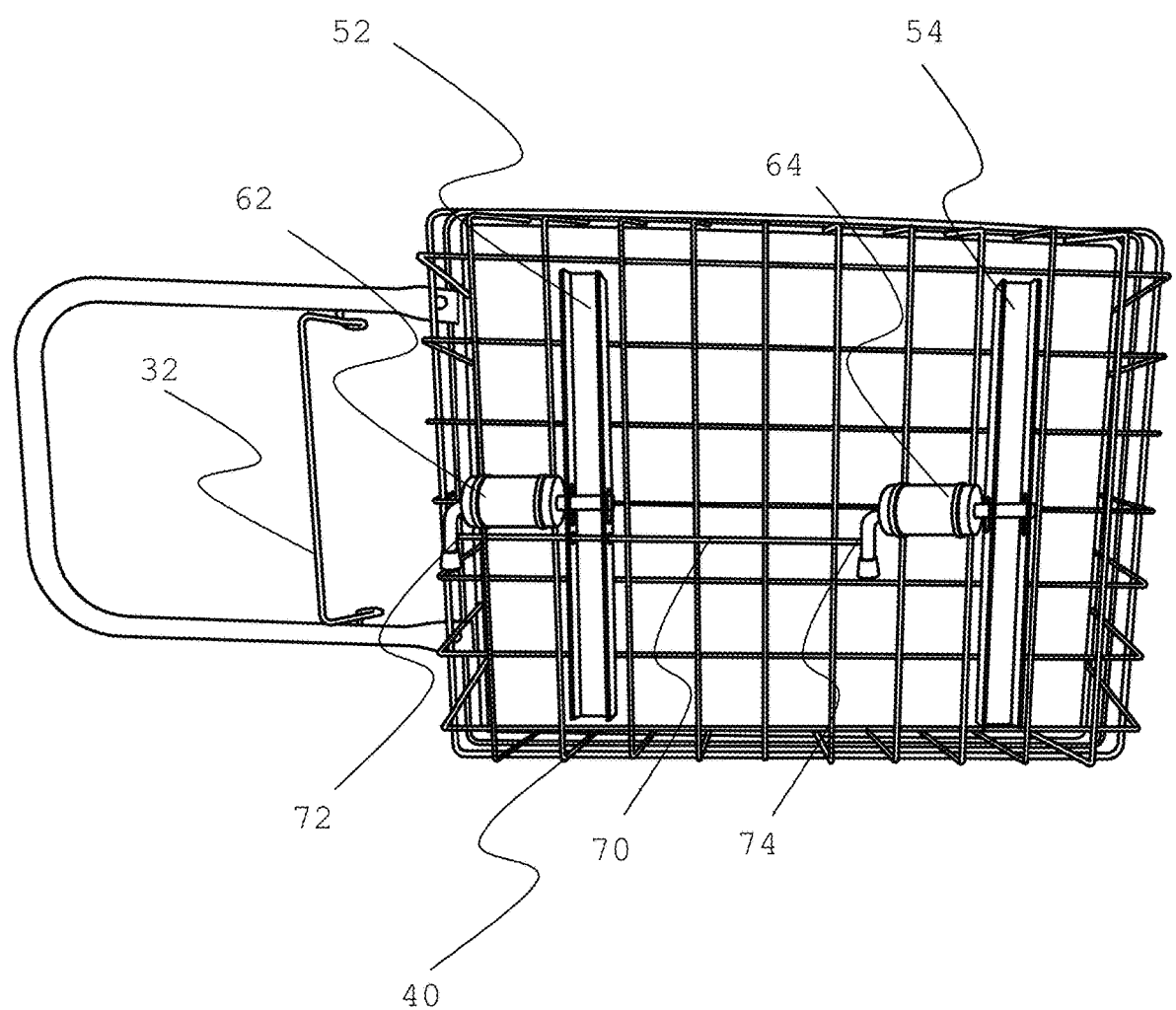
FIGS. 2A-2B show perspective views of the basket of the cart.
Figure 2B:
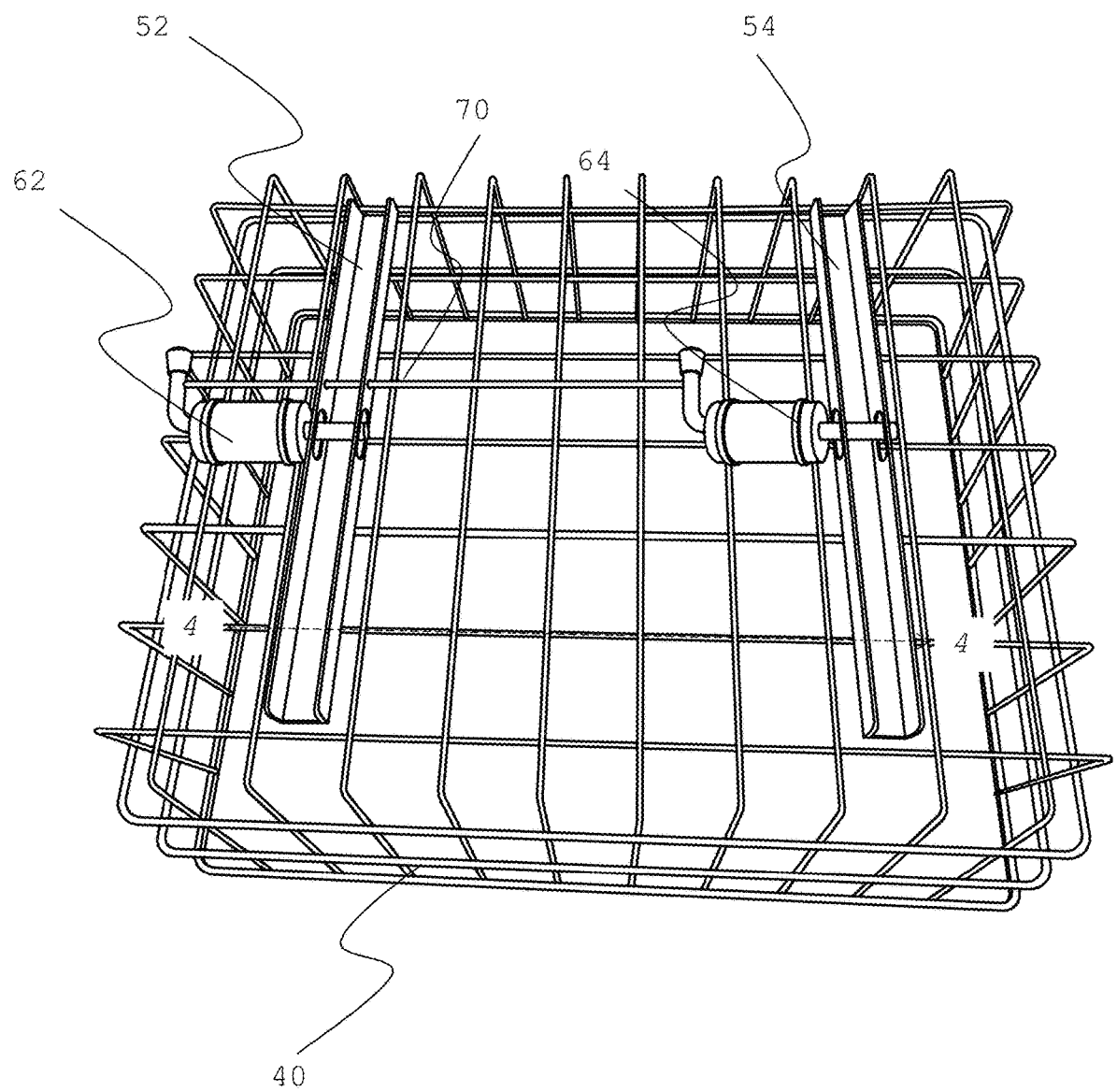

FIG. 1 shows a cart (100) including a body (10) having a caster (15) and a frame (20) wherein the frame includes first and second bars (21, 22). As shown in FIGS. 2A-2B, the cart (100) further includes a basket (40), first and second couplers (52, 54) (both couplers (52, 54) can adopt either construction shown in FIGS. 3A and 3B) attached to the basket (40) (directly or indirectly) wherein the first and second couplers (52, 54) removably couple in a snug fit with either the first and second bars (21, 22) respectively, or the second and first bars (22, 21) respectively. As shown in FIGS. 2A and 2B, the cart (100) further includes first and second latches (62, 64) attached to the basket (40) wherein the first and second latches (62, 64) are constructed to reversibly secure the first and second couplers (52, 54) respectively to either the first bar (21) and the second bar (22), or the second bar (22) and the first bar (21). Also shown is the cart (100) further including a latch-connecting means (70) comprising a first end (72) attached to the first latch (62) and a second end (74) attached to the second latch (64) such that the latch-connecting means (70) is between the first and second latches (62, 64). The basket may adopt any shape (e.g. square, elliptical, rectangular, cylindrical, prismatic, and the like) that facilitates storage of articles therein for transportation and/or depositing thereof. Also, the latch-connecting means may be a metal rod, a wire, a metal cable, or the like. Furthermore, as shown in FIGS. 2A, 2B, and 5B, each of the first and second bars (21, 22) of the frame (20) includes a hole (23) formed thereon, wherein the first latch (62) and the second latch (64) are constructed to be respectively fastened either to the holes (23) of the first and second bars (21, 22) or to the holes (23) of the second and first bars (22, 21). In other words, the first latch (62) and the second latch (64) (both attached directly or indirectly to the basket) may fasten individually to either the first bar (21) or the second bar (22) depending upon the orientation of the body (10).

Figure 7A:
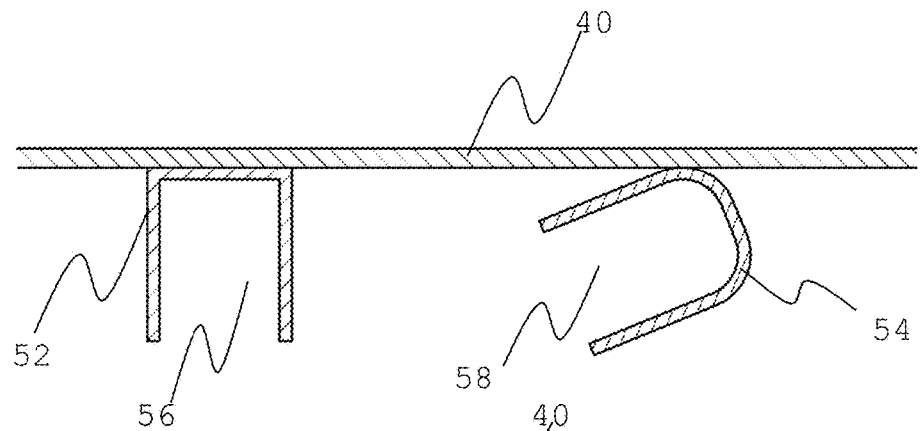
FIGS. 7A-7D show schematical cross-sectional views of the first and second couplers with respect to the basket of the carts of FIG. 6.
Figure 7B:
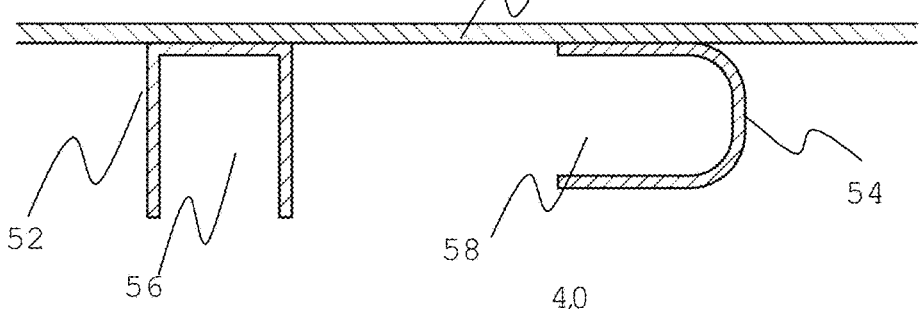
Figure 7C:
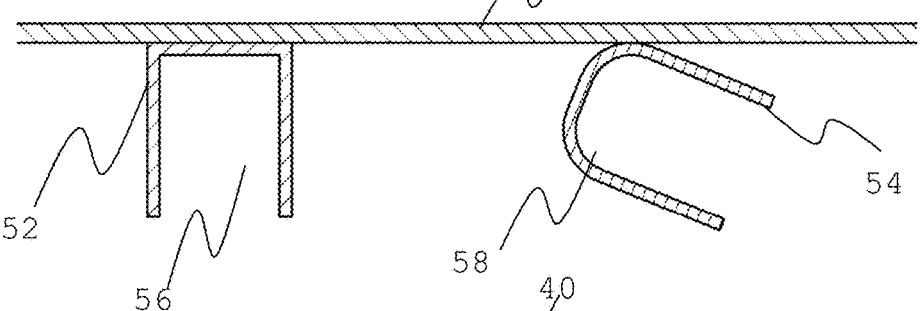
Figure 7D:
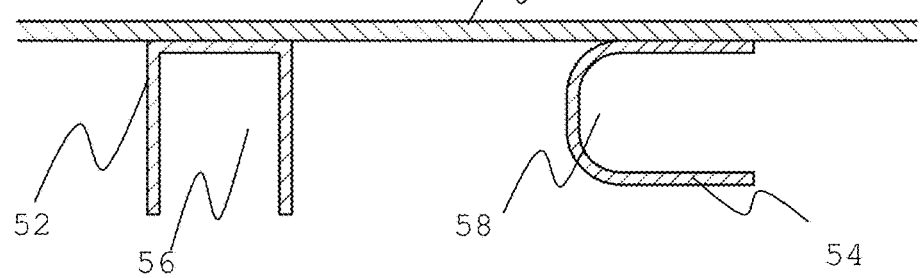

As shown in FIGS. 7A-7B, the frame (20) further includes a first frame member (26) and a second frame member (27), wherein each of the first bar (21) and the second bar (22) includes a first end (24) and a second end (25), wherein the first end (24) of the first bar (21) and the first end (24) of the second bar (22) each form first junctions (28) with the first frame member (26), wherein the second end (25) of the first bar (21) and the second end (25) of the second bar (22) each form second junctions (29) with the second frame member (27), and wherein each of the first junctions (28) and each of the second junctions (29) are preferably T-shaped, to maintain the greatest stability within the frame (20). FIG. 7B shows a distance between the first junctions (28) on the first frame member (26) approximates a distance between the second junctions (29) on the second frame member (27), wherein the first latch (62) is substantially aligned to the hole (23) of the first bar (21) and the second latch (64) is substantially aligned to the hole (23) of the second bar (22), or the first latch (62) is substantially aligned to the hole (23) of the second bar (22) and the second latch (62) is substantially aligned to the hole (23) of the first bar (21). Further, the holes (23) of the first and second bars (21, 22) are formed about the central area of the first and second bars. Furthermore, the holes (23) of the first and second bars (21, 22) are about the same distance from each other in opposite directions. Preferably, the holes (23) of the first and second bars (21, 22) are formed at centers of the first and second bars (21, 22). There is no limit to the number of bars, frame members, or casters (15), as they can be added or subtracted depending upon the task or purpose set out for the cart (100). However, as shown in FIGS. 7A-7B, the preferable number of casters (15) is four, the preferable number of frame members (26, 27) is two, and the preferable number of bars is four.

As shown in FIGS. 4A-4D, the first coupler (52) forms a groove (56) to receive therein at least a portion of either the first bar (21) or the second bar (22). As shown in FIGS. 4A-4D, the second coupler (54) forms a groove (58) to receive therein at least the portion of either the second bar (22) or the first bar (21). The first and second couplers (52, 54) can be either short or long in length, the latter of which cannot be longer in length than the respective lengths of the first and second bars individually. Preferably, the length of the first coupler (52) approximates a length of each of the first and second bars (21, 22) and a width of the first coupler (52) is slightly greater than a width of each of the first and second bars (21, 22) such that either of the first and second bars (21, 22) can be individually received in the groove (56) of the first coupler (52). Also shown in FIGS. 2A-2B is a hole (53) formed on the first coupler (52). The first latch (62) is constructed to be fastened to the hole (53) of the first coupler (52) and the first latch (62) is constructed to be fastened either to the hole (23) of the first bar (21) or the hole (23) of the second bar (22). Preferably, the hole formed on the first coupler is a through-hole.

Figure 5A:
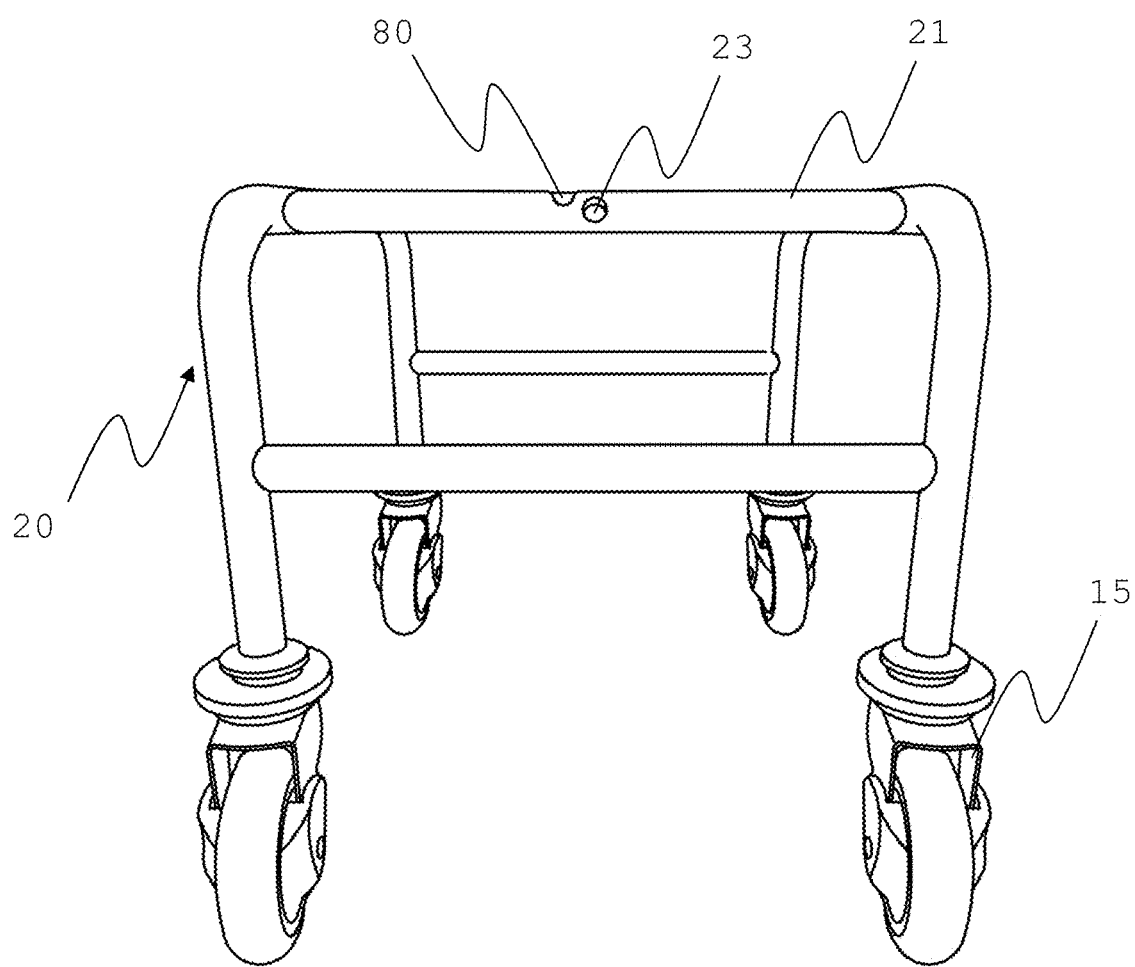
FIGS. 5A-5B show perspective views of the body of the cart.
Figure 5B:
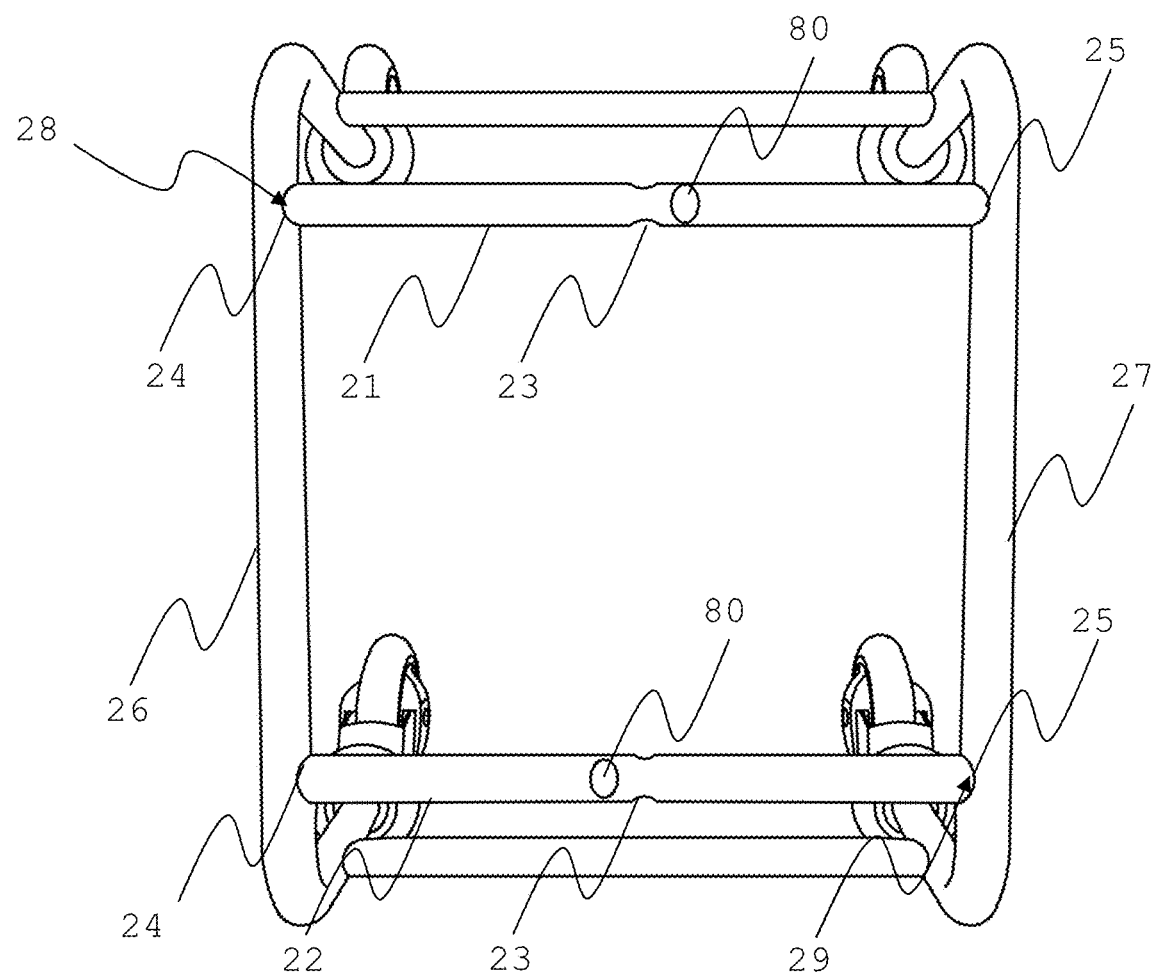

As shown in FIGS. 2A and 2B, the first coupler (52) further includes a connecting-hole (55) sized to permit the latch-connecting means (70) to pass therethrough, and, as shown in FIGS. 5A-5B, each of the first and second bars (21, 22) further includes a latch-connecting means groove (80) to allow passage of the latch-connecting means (70). Additionally, the latch-connecting means groove (80) provides structural support for the latch-connecting means (70) to connect the first and second latches (62, 64) such that the first and second latches (62, 64), preferably, act in unison upon the use of the first latch by the user (i.e. using the first latch (62) would cause the same in the second latch (64)). Also shown, the first and second latches (62, 64) are positioned about a medial line of the first and second couplers (52, 54) such that the first and second latches (62, 64) are substantially aligned with the hole (53) of the first coupler (52) and the hole (23) of the first bar (21) and the hole (23) of the second bar (22).

Figure 8:
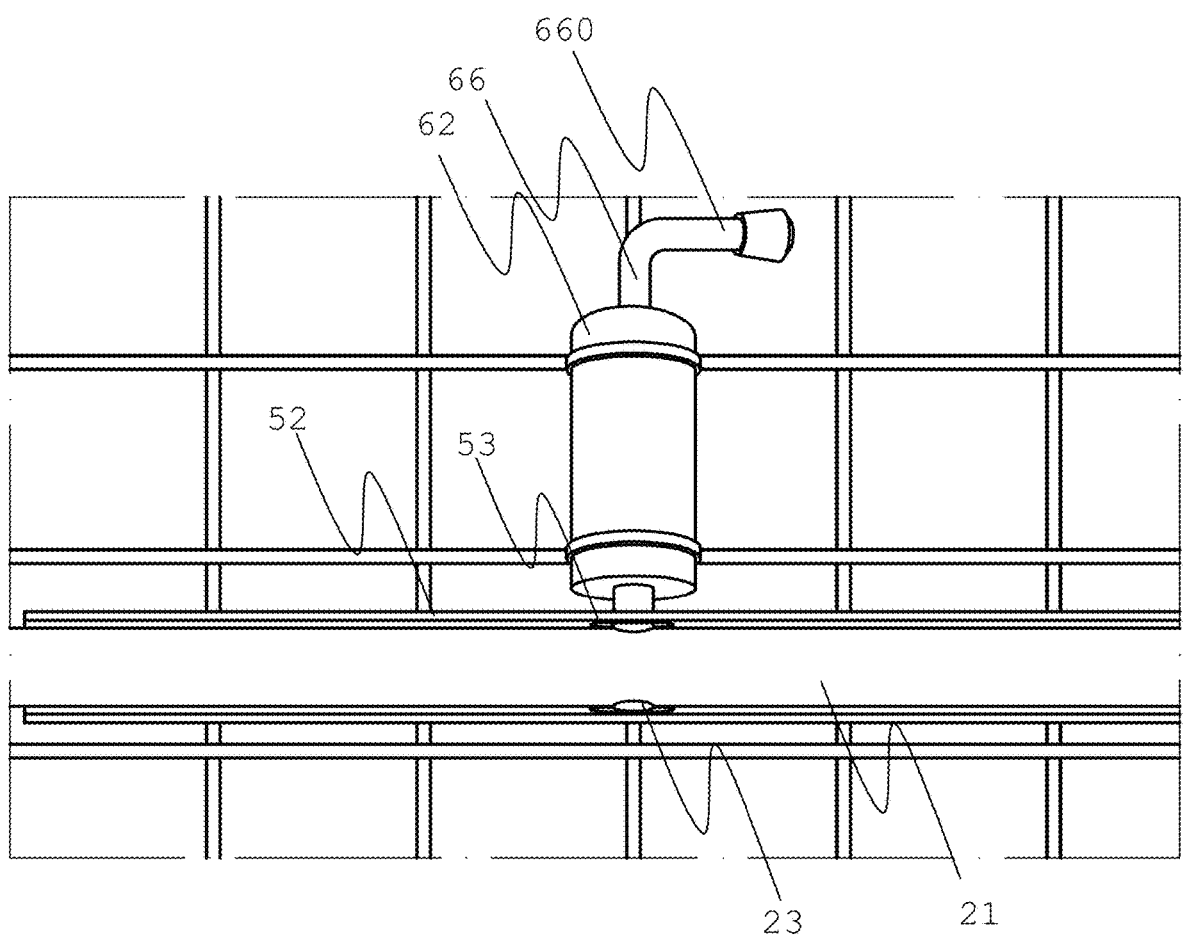
FIG. 8 shows a partial bottom plan view of the cart.
Figure 10A:
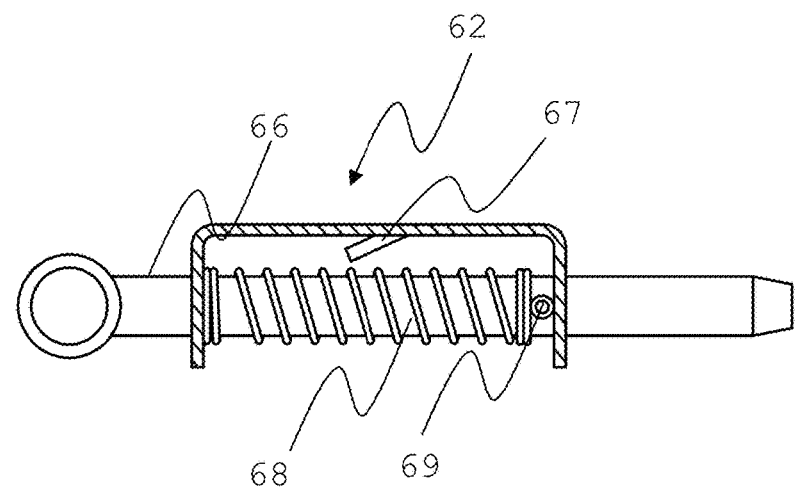
FIGS. 10A-10C show schematical cross-sectional views of the latch.
Figure 10B:
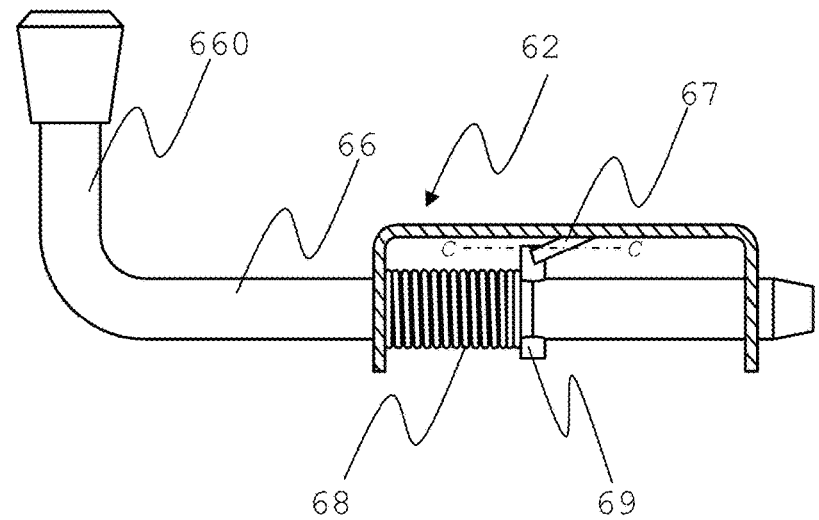

The second coupler (24) can be rectangular or curved (FIGS. 3A and 3B respectively) such that the second coupler (54) removably couples with the any of the two bars (21, 22) in a snug fit. The second coupler (54) may adopt a variety of shapes to removably couple with any one of the two bars (21, 22). For example, the second coupler may adopted a turned-"C" shape to removably couple with any one of the first and second bars (21, 22). As shown in cross-sectional view of the second coupler (24) in FIGS. 4A-4D, the second coupler (54) can be curved such that the second coupler (54) is substantially shaped as a "∩" to form a groove (58), the groove (58) constructed to receive either the first bar (21) or the second bar (22) of the frame (20). Preferably, the groove (58) of the second coupler (54) is preferably directed downwardly towards either the first or second bars (21, 22) as shown in FIGS. 4A-4D. In such a configuration, the second coupler (54) is and the first coupler (52) can be dropped down onto the body (10) (specifically, either the first bar and second bar (21, 22), or vice versa) by the basket's (40) own weight in a downward direction such that the first latch (62) having a pin (66), or both first and second latches (62, 64) having a pin (66), as shown in FIG. 10B. Having such the pin (66) of FIG. 10B, the pin (66) is pushed backwards upon landing on either the first bar (21) or the second bar (22) by the weight of the basket (40). This backwards push of the pin (66) is such that the pin (66) moves outwards from the hole (53) of the first coupler (54) (and/or the second coupler (56)) and soon thereafter, as the basket (40) continues to move downward and the pin (66) faces a hole (23) of either the first bar (21) or the second bar (22) as shown in FIG. 8, the pin (66) moves towards and into the hole (23) of either the first bar (21) or the second bar (22) (or both), thus enabling the semi-automatic locking of the first latch (62) to the first coupler (52) and either the first bar (21) or second bar (22), or, alternatively, the locking of the first and second latches (62, 64) to the first and second couplers (52, 54) respectively.

Figure 3A:
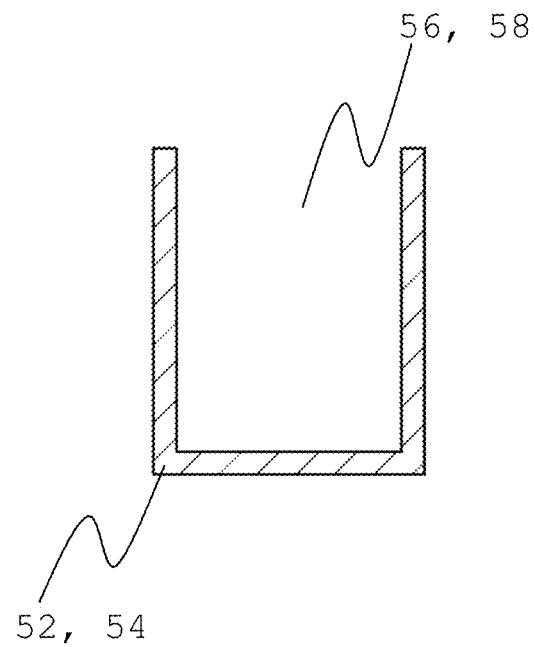
FIGS. 3A-3B show schematical cross-sectional views of the either the first or second couplers of the cart.
Figure 3B:
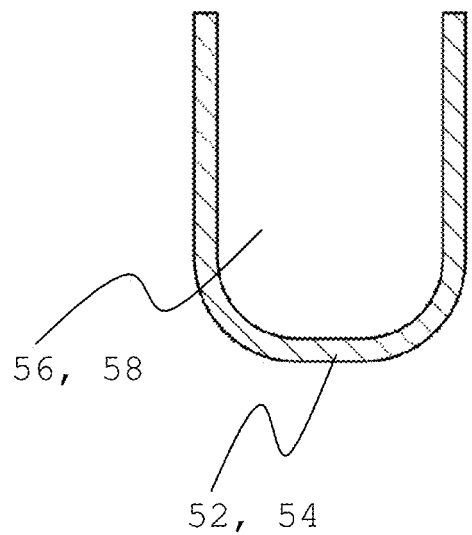
Figure 4A:
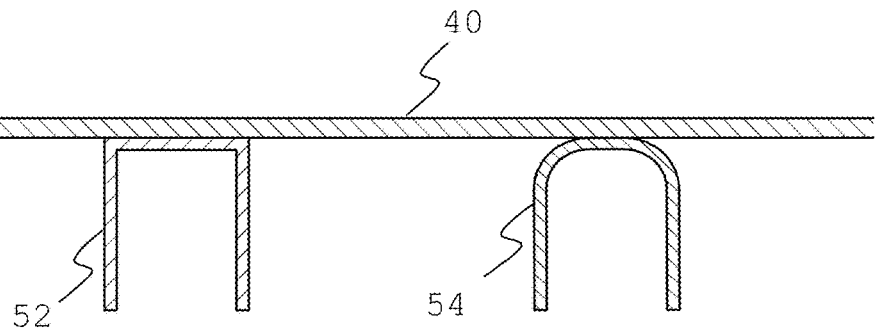
FIGS. 4A-4D show schematical cross-sectional views of the cart of FIG. 2B.
Figure 4B:
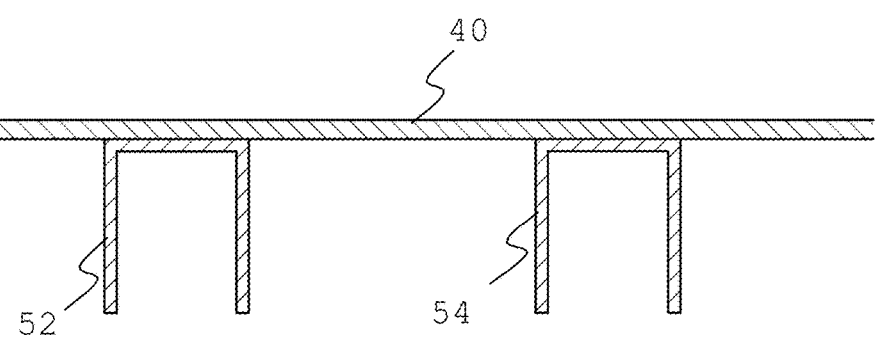
Figure 4C:
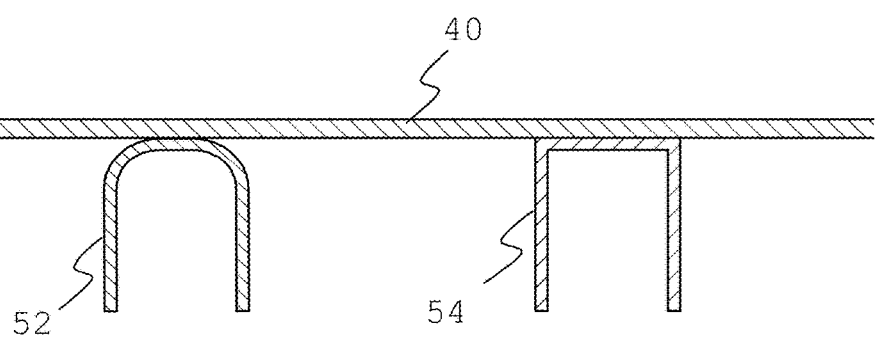
Figure 4D:
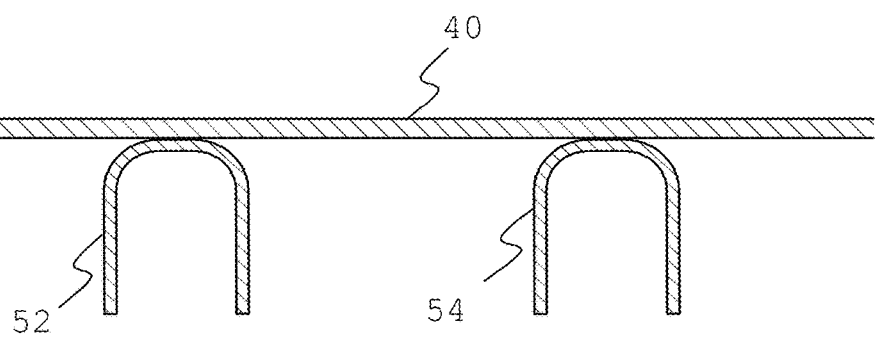

Additionally, the first coupler (52) shown in FIG. 3A may adopt an alternative structural construction resembling as shown in FIG. 3B, being curved rather than having sharper, defined corners, or the second coupler (54) may adopt the structural construction of the first coupler (52) shown in either FIGS. 3A and 3B, as either configuration can support a close fit or a snug fit of any of the first and second bars (21, 22). Alternatively, the first coupler (52) and the second coupler (54) may both adopt a similar configuration to each other as shown in FIG. 4B or 4D. Alternatively, the first coupler (52) and the second coupler (54) can both adopt the configuration as shown in FIGS. 4A and 4C.

Figure 9A:
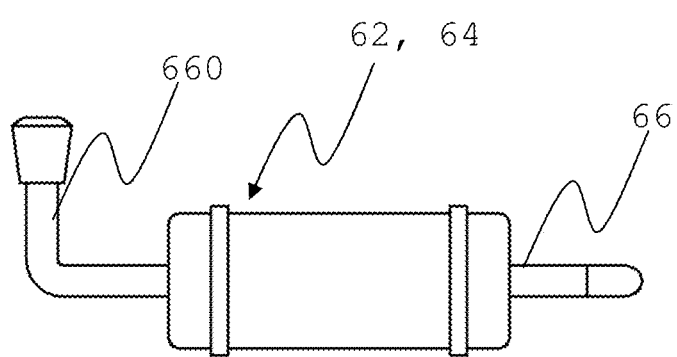
FIGS. 9A-9B show a perspective view of the latches of the cart.
Figure 9B:
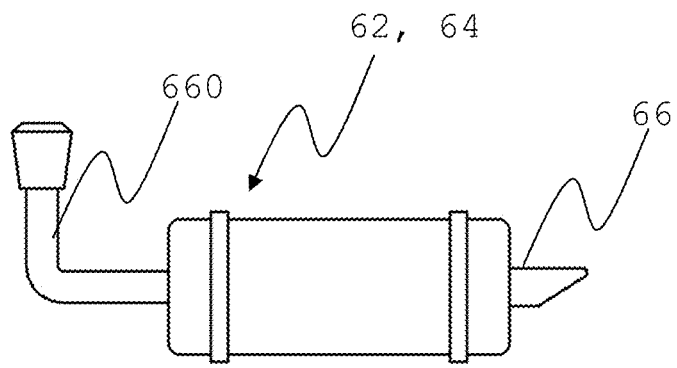
Figure 10C:
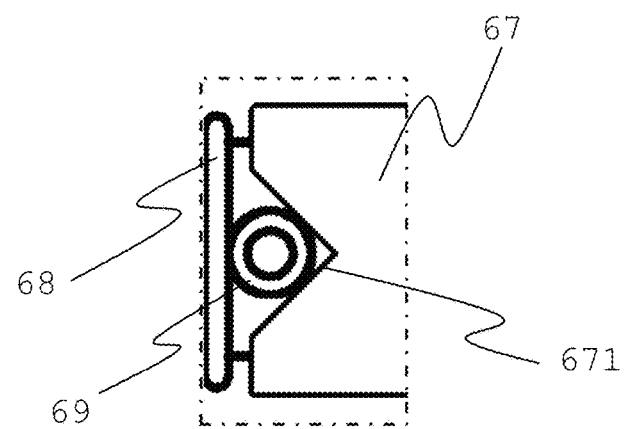

Each of the first and second latches (62, 64) includes a pin (66) wherein a portion of the pin (66) includes a latch handle (660). As shown in FIG. 9A, the pin (66) can be substantially rounded. Alternatively, as shown in FIG. 9B, the pin (66) is substantially angled. Both configurations are important to permit the first and second latches (62, 64) to semi-automatically lock the first and second couplers (52, 54) to the corresponding bar of the frame using the weight of basket (40), with or without articles being carried, downward onto the pin (66). FIG. 9B being the preferred construction and configuration to permit this semi-autolocking of the basket (40) to the body (10). Furthermore, as shown in FIGS. 10A and 10B, the first latch (62) is spring-loaded which includes a spring (68), and a catch (67) while the pins (66) of the first and second latch include a stopper (69); the second latch (64) may also be spring-loaded with a spring (68). When a user pulls the pin (66) of the first latch (62) of FIG. 10A, the spring (68) coils tightened and the stopper (69) is moved towards the pulling direction, pulling slightly past the catch (67). Then, the user rotates the pin (66) such that the stopper (69) rotates towards the catch (67) and the user releases the pin (66), the stopper (69) of the pin (66) moves forward and is caught by a notch (671) of the catch (67), as shown in FIG. 10C (a sectional view of FIG. 10B as denoted by "C"). The notch (671) may be substantially "v"-shaped or substantially "u"-shaped. The edges of the catch (67) forming an entryway of the notch (671) may be substantially straight, substantially rounded, or substantially curved. Alternating portions of the entryway of the notch (671) may be substantially straight, substantially rounded, or substantially curved. With the stopper (69) caught by the notch (671), the stopper (69) stays in place and the pin (66) is fully withdrawn from the hole (23) of the first bar (21) (or the second bar (22)) and the hole (53) of the first coupler (52) such that the user can now start to separate the basket (40) from the body (10). When the user places the basket (40) onto the body (10) such that the first and second couplers (52, 54) receive the first and second bars (21, 22) and the stopper (69) of the pin (66) is still caught by the notch (671) of the catch (67), the user can pull the pin (66) to withdraw the stopper (69) from the notch (671) of the catch (67), rotate the stopper (69) away from the catch (67), and release the pin (66), by virtue of the spring (68) uncompressing, the pin (66) can spring forward towards the either hole (23) of the first and second bars (21, 22) and the hole (53) of the first coupler (52). The stopper (69) either penetrates through the pin (66) as unitary structure such that a first end of the stopper (69) protrudes from the pin (66) and a second end of the stopper (69) protrudes from the pin (66) at a different angle with respect to the first end of the stopper (69). Alternatively, the stopper (69) protrudes from multiple locations on a surface of the pin (66). Preferably, the stopper (69) penetrates through the pin (66) as a unitary structure with the first end of the stopper (69) about 180° away from the second end of the stopper (69) because such a structure offers greater structural strength for the stopper (69) being caught by the notch (671) of the catch (67) since the stopper (69) is still experiencing forward pressure by the substantially compressed spring (68) trying to release energy. Thus, the pin (66) structure of FIGS. 10A-C aids in reversibly locking the pin (66) of the first latch (62). The first latch (62), as well as the second latch (62) can be substituted for any locking means known in the art that does not depart from the spirit and scope of this invention.

Figure 6:
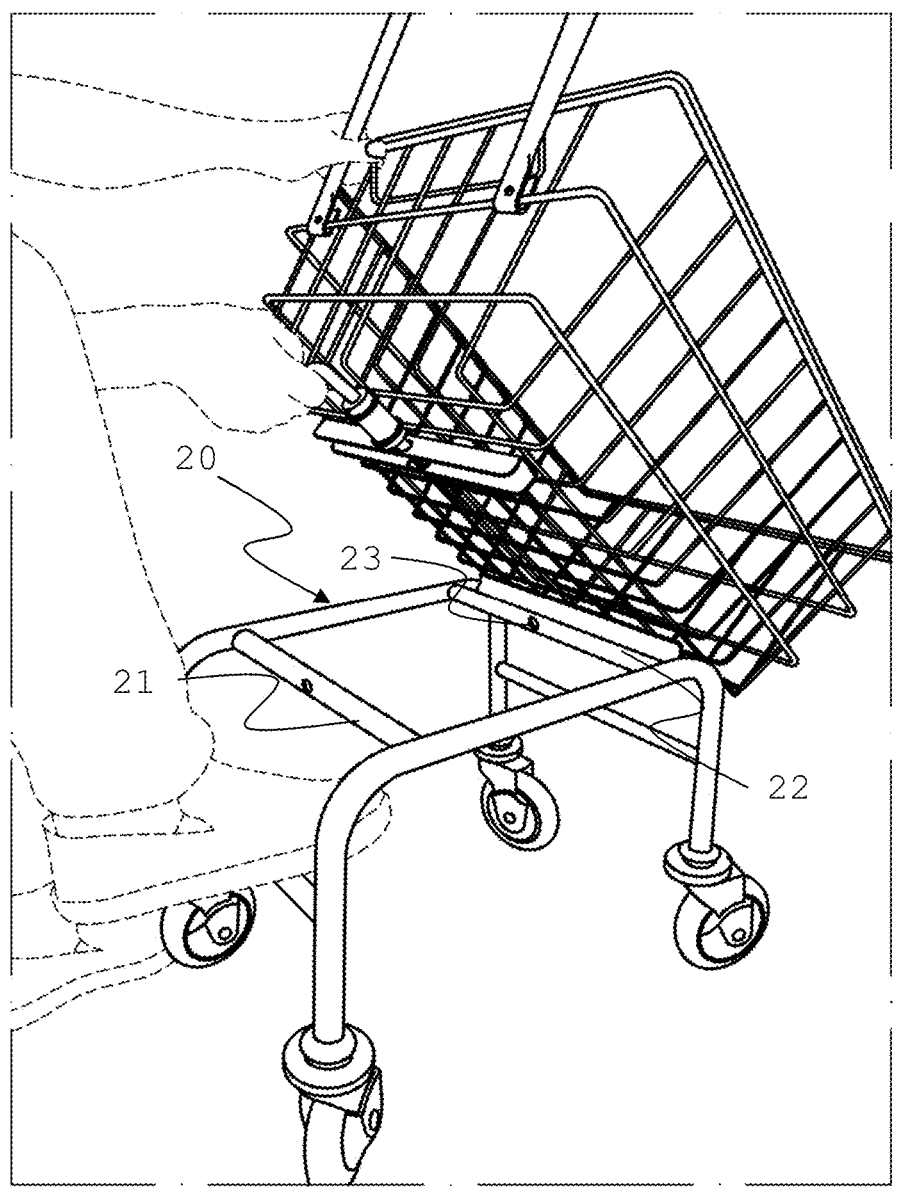
FIG. 6 shows a partial perspective view of the cart handled by a user.

As shown in FIGS. 1, 2A, 11, and 12, the cart further includes a handle (30) rotatably attached to the basket. Specifically, as shown in FIGS. 2A and 6, the handle (30) includes a lower end that wraps around a portion of the mesh (42) of the basket (40) and then back onto the lower end such that a portion of the basket (40) passes through a gap formed by the lower end of the handle (30). The handle (30) further includes a rotatable clamp (32), and the rotatable clamp (32) reversibly secures the handle (30) to the basket (40). As shown in FIG. 2A, the handle (30) includes a rotatable clamp (31) that swings over the basket such that the handle is secured to the basket.

Figure 11:
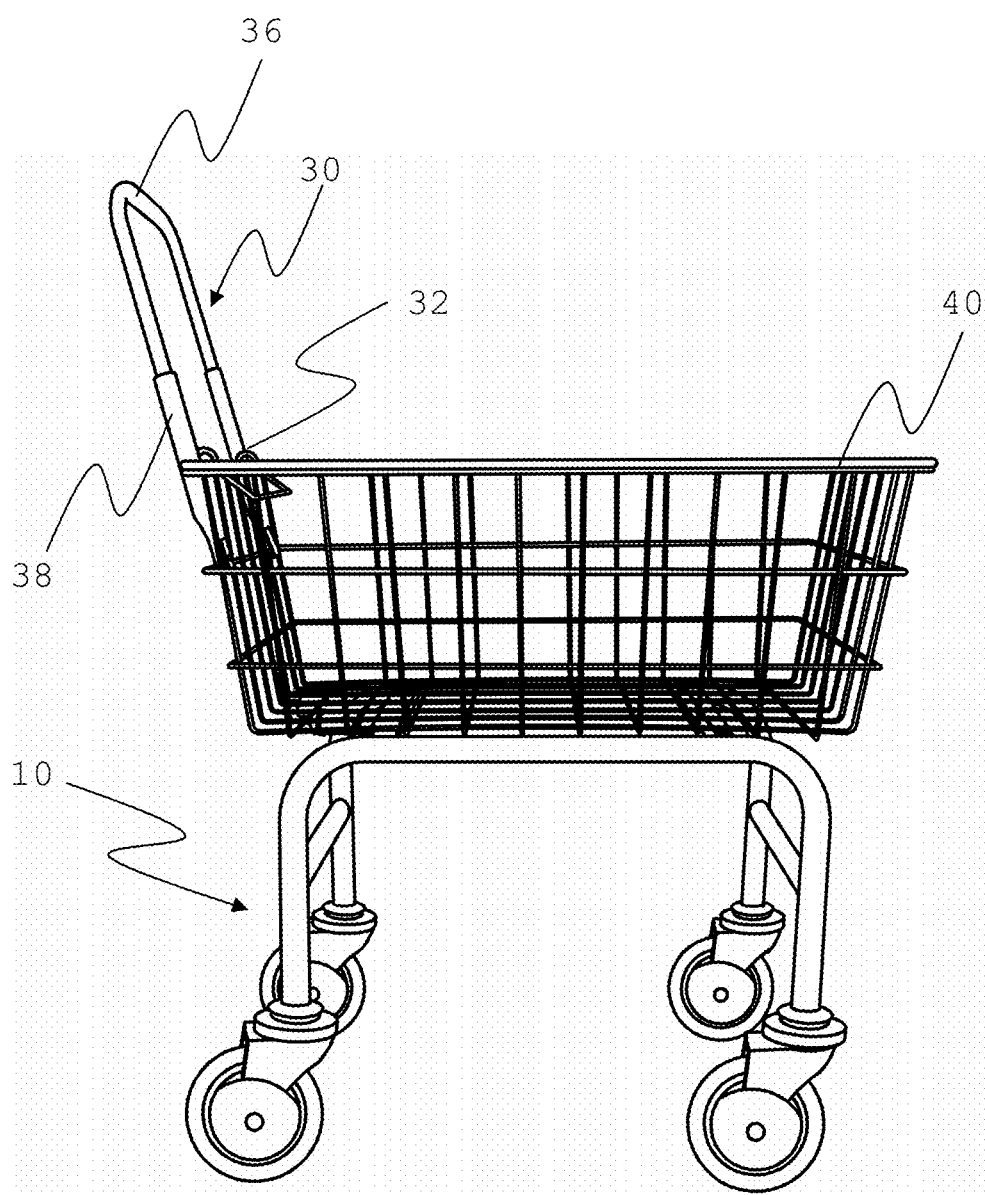
FIG. 11 shows a perspective view of the cart with a telescoping handle.

Additionally, as shown in FIG. 11, the handle (30) further includes a handle portion (36) and a handle-housing portion (38). The handle portion (36) telescopes with the handle-housing portion (38) to adjust a height of the handle (30). This structural feature allows the user to reduce the height or the size of the handle (30) such that the user can find a height of the handle (30) that is suitable for the user's size, or the user can adjust the height of the handle (30) to allow the cart (100) to be conveniently stowed when the handle (30) is decoupled from the basket (40) by the rotatable clamp (32) of the handle (30).

Figure 12:
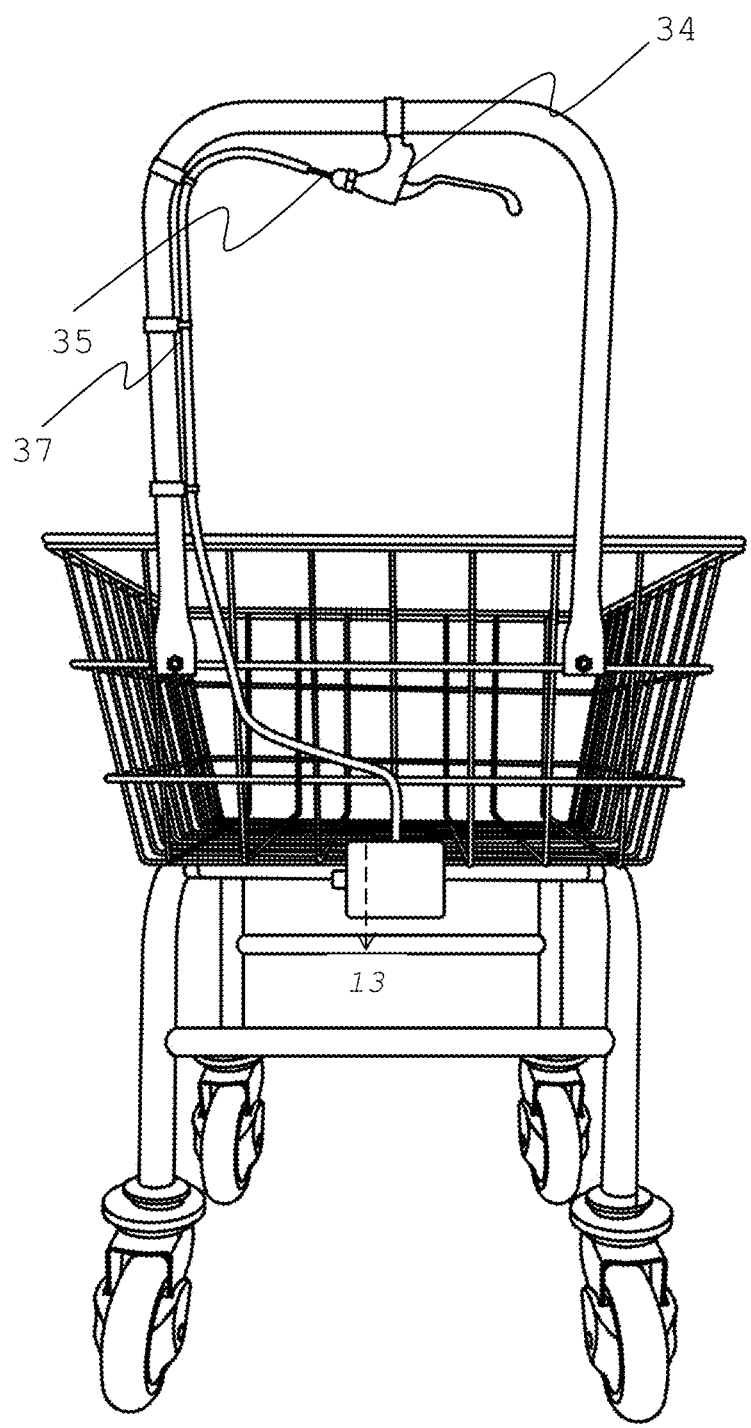
FIG. 12 shows a perspective view of the cart with a latch-controlling means.

Additionally, as shown in FIG. 12, the handle (30) includes a latch-controlling means (34) to control movement of the pin (66) of the first latch (62) and the pin (66) of the second latch (64). The latch-controlling means (34) includes a braking mechanism (similar to that of either cantilever brakes found on bicycles or self-locking hand-brakes found on walkers) and cable (35) and a sleeve (37). Briefly, the latch-controlling means (34) is positioned on the handle (30), preferably on a top of the handle (30) such that user application of the latch-controlling means (34) coincides with the user lifting movement of the handle (30) when desiring to decouple the first coupler (52) from either the first or second bar (21, 22) with which the first coupler (52) is coupled. The cable (35) is either exposed to the environment or lying within the sleeve (37), or both. As shown in FIG. 12, the cable (35) connects to the pin (66) of the first latch (62) wherein an actuation of the latch-controlling means (34) by the user (mimicking the hand motion of using a bicycle brake) causes a displacement of the cable (35) that leads to a displacement of the pin (66) of the first latch (62) in a direction opposite of the first coupler (52). Since the first latch (62) is tied to the second latch (64) by the latch-connecting means (70), the displacement of the pin (66) of the first latch (62) causes the displacement of the latch-connecting means (70) which leads to the displacement of the pin (66) of the second latch (64) towards a direction of the first latch (62). The displacement of the pin (66) of the first latch (62) allows the user to decouple the first coupler (52) from either the first bar (21) or second bar (22) with which the first coupler (52) is coupled that allows the basket (40) to detach from the body (10) of the cart (100).

Figure 15:
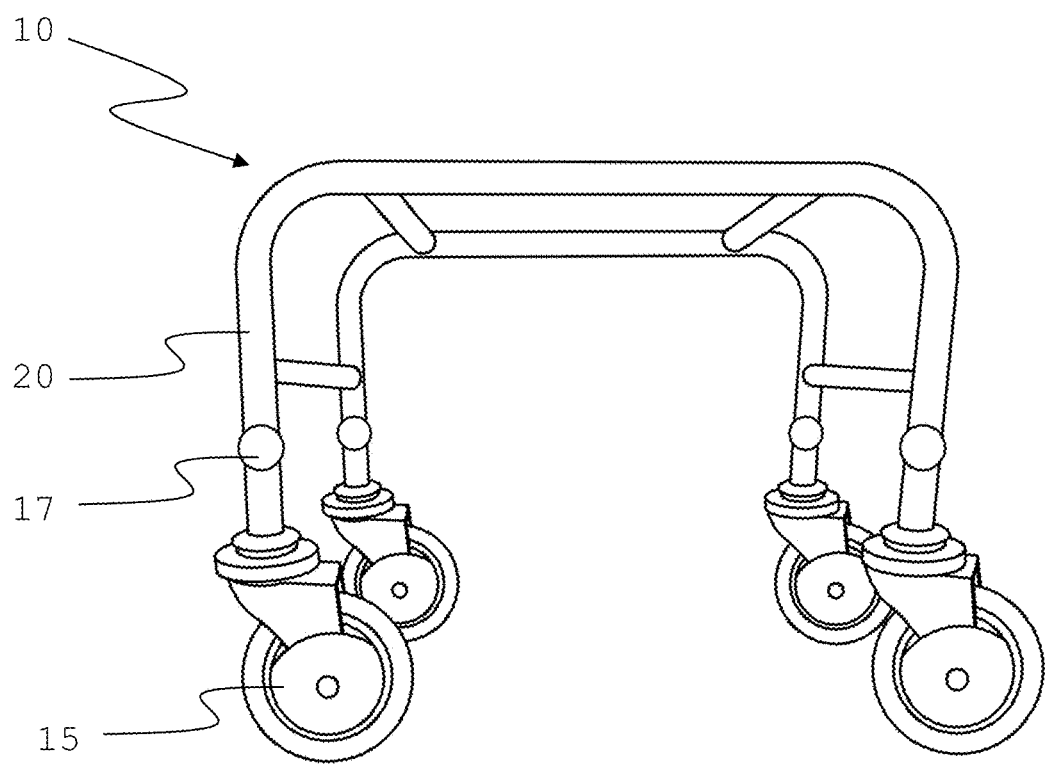
FIG. 15 shows a perspective view of the body of the cart.
Figure 16A:
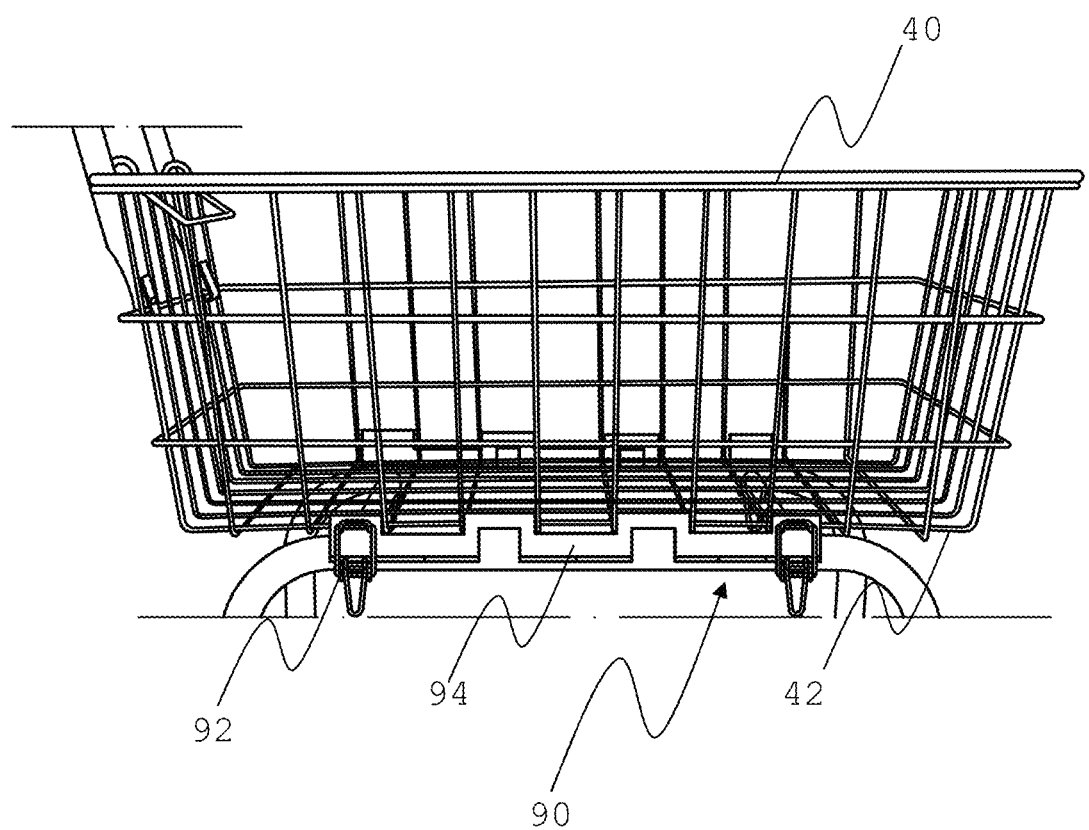
FIG. 16A shows a partial side view of the cart.
Figure 16B:
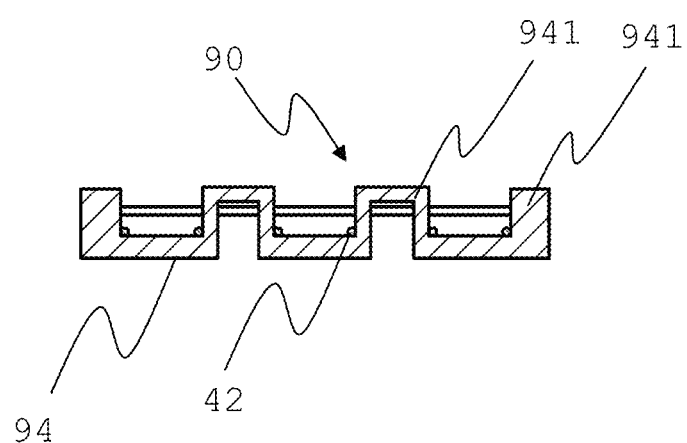
FIG. 16B shows a schematical cross-sectional view of the clamping means of the cart of FIG. 16A.

As shown in FIG. 15, the caster (15) of the cart removably couples with the frame (20) via a push-button (16) such that the caster (15) is constructed to be attachable to or detachable from the frame (20). Alternatively, this push-button (16) mechanism can also be used to control telescoping of a portion of the frame (20) that lies towards its corresponding caster (15). In this embodiment, the frame's (20) height can be adjustable to suit the user's needs with respect to a particular job the user intends for the cart (100), or even for cart (100) storage purposes. Alternatively, as shown in FIGS. 16A-B, the caster (15) couples with the frame (20) via a rotatable hinge (17) such that the caster (15) folds underneath the frame (20) for convenient storage of the cart.

In an alternative embodiment, FIG. 6 shows a cart (100) comprising a body (10) including a frame (20) and a caster (15). The frame (20) includes first and second bars (21, 22); a basket (40); first and second couplers (52, 54) attached to the basket (40). The first and second couplers (52, 54) removably couple in a snug fit with either the first and second bars (21, 22) of the frame (20) respectively, or the second and first bars (22, 21) of the frame respectively (20). As shown in FIG. 6, the cart (100) further includes a latch (62) attached to the basket (40) with the latch (62) reversibly securing the first coupler (52) to either the first bar (21) or the second bar (22); the latch (62) may be directly or indirectly attached to the basket (40). As shown in FIG. 5B, the first and second bars (12, 14) includes a hole (13, 15) formed thereon. The first bar (12) removably coupled with either the first coupler (22) or the second coupler (22), and the second bar (14) is removably coupled with either the first coupler (22) or the second coupler (23). The frame (20) further includes a first frame member (26) and a second frame member (27). Each of the first bar (21) and the second bar (22) include a first end (24) and a second end (25). As shown in FIG. 5B, each of the first end (24) of the first bar (21) and the first end (24) of the second bar (22) form first junctions (28) with the first frame member (26), each the second end (25) of the first bar (21) and the second end of the second bar (22) form second junctions (29) with the second frame member (27), and each of the first junctions (28) and each of the second junctions are T-shaped (29). A distance between the first junctions (28) on the first frame member (26) is similar to a distance between the second junctions (29) on the second frame member (27). As shown in FIG. 6, the latch (62) is substantially aligned to the hole (23) of the first bar (21) and/or the hole (23) of the second bar (21).

Figure 18A:
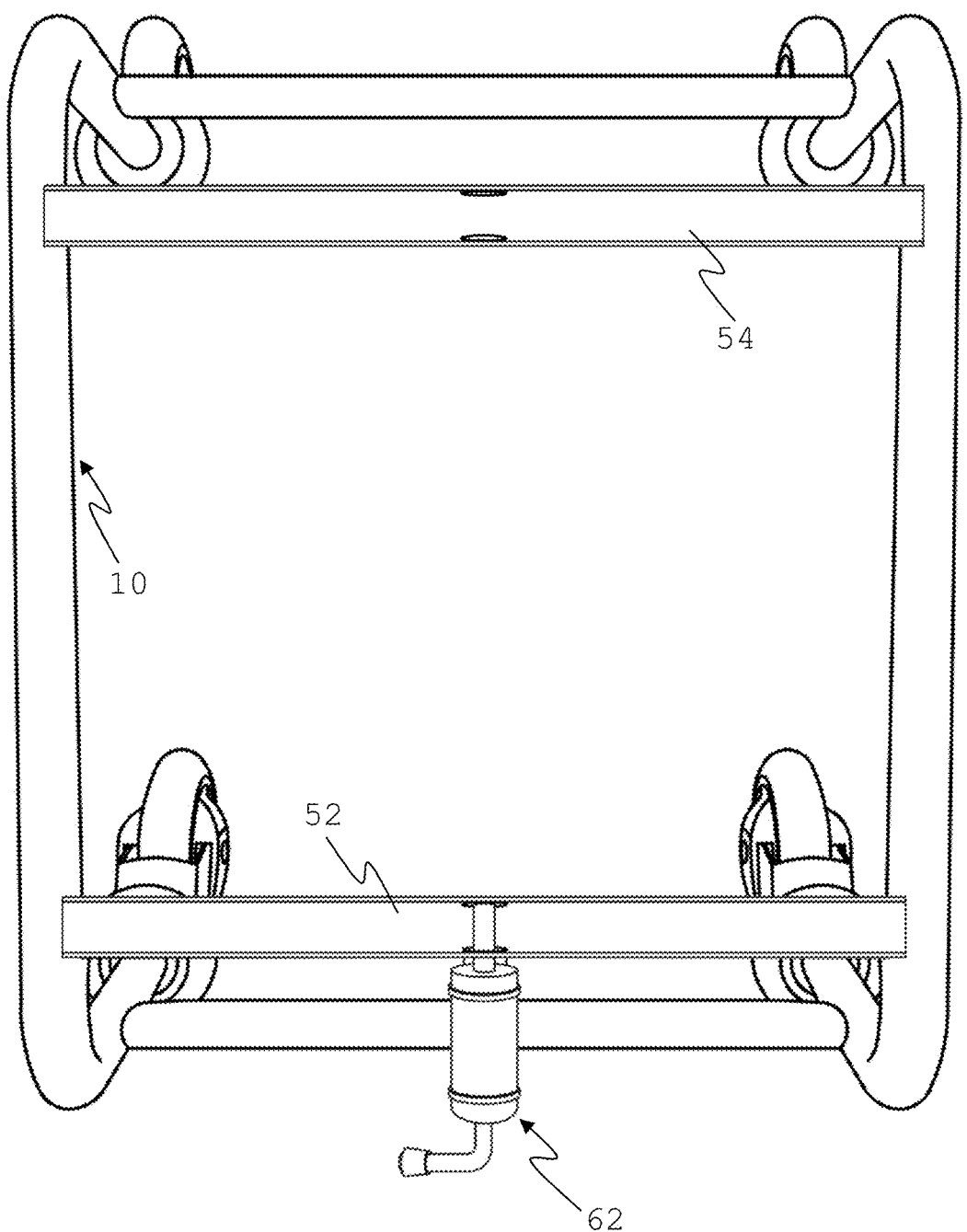
FIG. 18A shows a top plan view of the body of the cart.
Figure 18B:
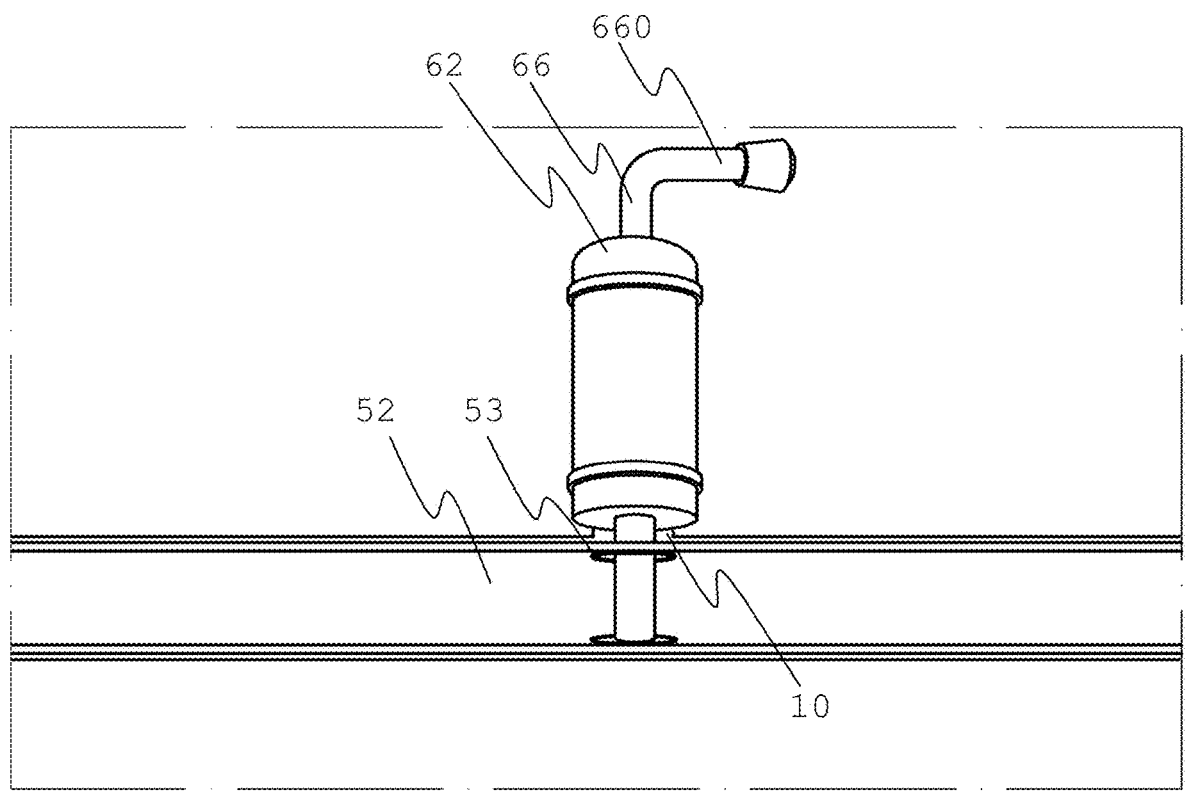
FIG. 18B shows a partial top plan view of body of the cart.
Figure 18C:
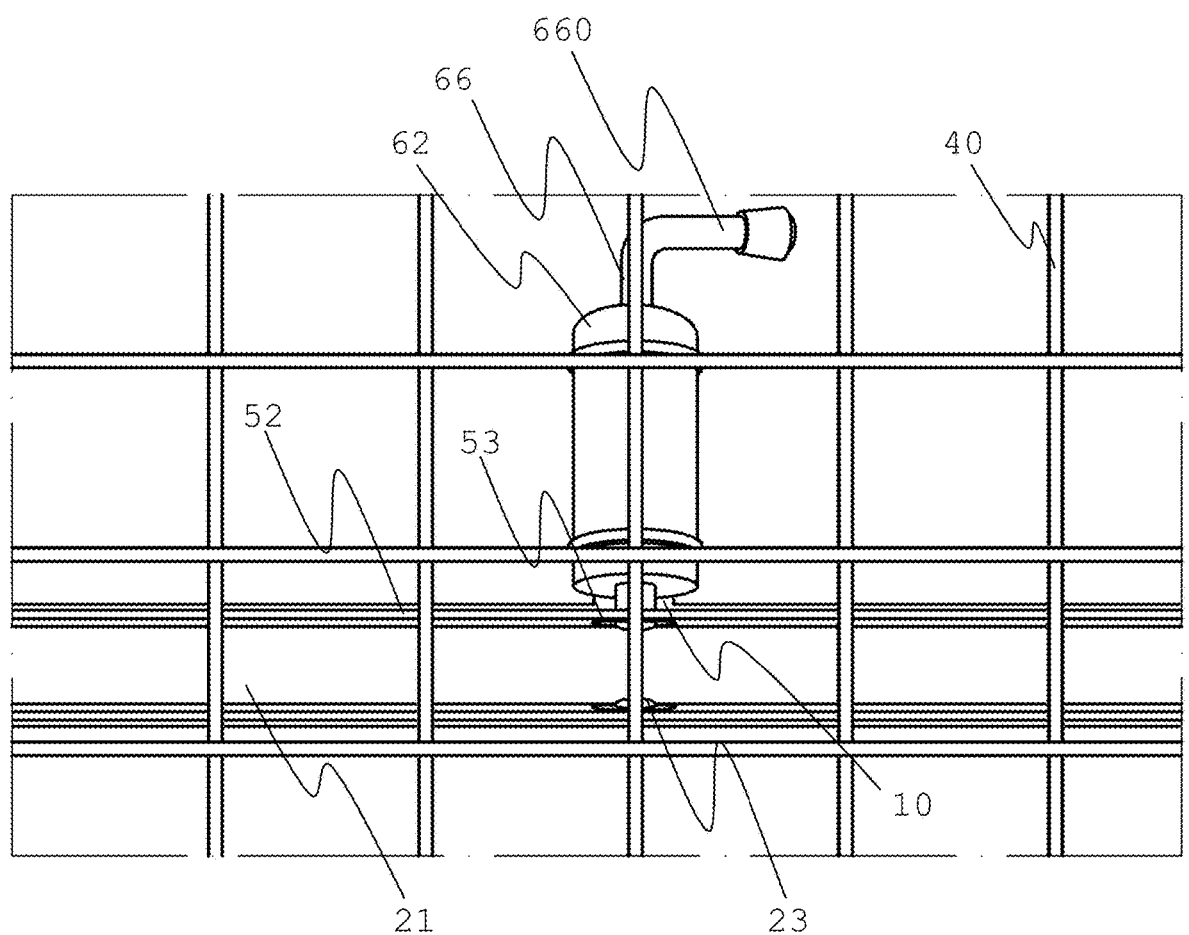
FIG. 18C shows a partial top plan view of the cart.

As shown in FIGS. 6 and 8, the couplers (52, 54) are constructed to secure the basket (40) to the body (10). The couplers (52, 54) are positioned directly or indirectly on an underside surface of the basket, preferably directly as shown in FIG. 8; FIGS. 18A-C show indirect positioning of the couplers (52, 54) on the body (10) with FIG. 18C illustrating the first coupler (52) coupling to a portion of either the first or second bars (21, 22) on the underside surface of the basket (40). As shown in FIGS. 7A-7D, the first coupler (52) forms a first coupler groove (56) to receive therein at least a portion of either the first bar (21) or the second bar (22), and wherein the second coupler (54) forms a second coupler groove (58) to receive therein at least the portion of either the first bar (21) or the second bar (22). As stated earlier, the length of either the first and second couplers (52, 54) can either be short or long. The length of the first coupler (52) approximating a length of each of the first and second bars (21, 22), and a width of the first coupler (52) is greater than a width of each of the first and second bars (21, 22) such that either of the first and second bars (21, 22) can be individually received in the groove (56) of the first coupler (52) in a snug fit. Also shown in FIG. 8, is a hole (53) formed on the first coupler (52), wherein the hole (53) of the first coupler (52) and the hole (23) of either the first bar (21) or the second bar (22) that is received by the first coupler (52) are substantially aligned. Optionally, the second coupler (54) may include a hole (53), wherein the hole (53) of the second coupler (54) and the hole (23) of either the first bar (21) or the second bar (22) that is received by the second coupler (54) are substantially aligned. Further, as shown in FIG. 5B, the holes (23) of the first and second bars (21, 22) are formed about the central area of the first and second bars (21, 22). Furthermore, the holes (23) of the first and second bars (21, 22) are about the same distance from each other in opposite directions. Preferably, the holes (23) of the first and second bars (21, 22) are formed at centers of the first and second bars (21, 22). There is no limit to the number of bars, frame members, or casters (15), as they can be added or subtracted depending upon the task or purpose set out for the cart (100). However, as shown in FIGS. 5A-B, the preferable number of casters (15) is four, the preferable number of frame members (26, 27) is two, and the preferable number of bars is four. Additionally, FIGS. 5B and 6 also show the frame (20) including a third bar and a fourth bar. The third bar and the fourth bar can be positioned in a lower portion of the frame (20). This positioning is preferable for this embodiment because the user can use the third or fourth bars as additional leverage when transporting and/or depositing heavy articles. As shown in FIG. 6, this leverage is important when lifting the basket (40) during and following the decoupling of the first coupler (52) from either the first bar (21) or the second bar (22) with which the first coupler (52) corresponds.

Additionally, as shown in FIGS. 7A-7D, the second coupler (54) can be constructed to be curved such that the second coupler (54) is substantially shaped as a turned-"n" to form a groove (58) to receive either the first bar (21) or the second bar (22) of the frame (20). The turned-"∩" that forms the groove (58) of the second coupler (54) is angled such that either the first (21) or second bar (22) can be received, in a snug fit, within the groove (58) of the second coupler (54) by either sliding into the groove (58) of the second coupler (54), or being pushed into the groove (58) of the second coupler (54). As shown in FIG. 6, preferably, a user of the cart pulls the handle (30) or the basket (40) such that either the first (21) or the second bars (22) slide into the groove (58) of the second coupler (54) in a snug fit.

The latch, as shown in FIGS. 9A, 9B, 10A, and 10B, includes a pin (66), a catch (67) and a spring (68). The the latch (62) is spring-loaded and, as shown in FIG. 6, the pin (66) is biased towards the second coupler (54), similar to the first latch (62) mentioned above.

As shown in FIGS. 1, 2A, 11, and 12, the cart further includes a handle (30) rotatably attached to the basket. Specifically, as shown in FIGS. 2A and 6, the handle (30) includes a lower end that wraps around a portion of the mesh (42) of the basket (40) and then back onto the lower end such that the portion of the mesh (42) of the basket (40) passes through a passageway formed by the lower end of the handle (30). The handle (30) further includes a rotatable clamp (32), wherein the rotatable clamp (32) reversibly secures the handle (30) to the basket (40) such that the handle (30) is sufficiently immobile to be used to control the cart (100). As mentioned above and as shown in FIGS. 2 and 11, the rotatable clamp (32) is constructed to flip over and detachably couple with the basket (40).

Additionally, as shown in FIG. 11, the handle (30) further includes a handle portion (36) and a handle-housing portion (38). The handle portion (36) is constructed to be telescoping with the handle-housing portion (38) to allow adjustment of a height of the handle (30) or collapse the handle (30) such that the handle (30) (collapse) would permit convenient storage of the cart (100). Furthermore, this structural feature allows the user to reduce the height or the size of the handle (30) such that the user can find a height of the handle (30) that is suitable for the user's size, or the user can adjust the height (30) of the handle to allow the cart (100) to be conveniently stowed when the handle (30) is decoupled from the basket by the rotatable clamp (32) of the handle (30).

Figure 13:
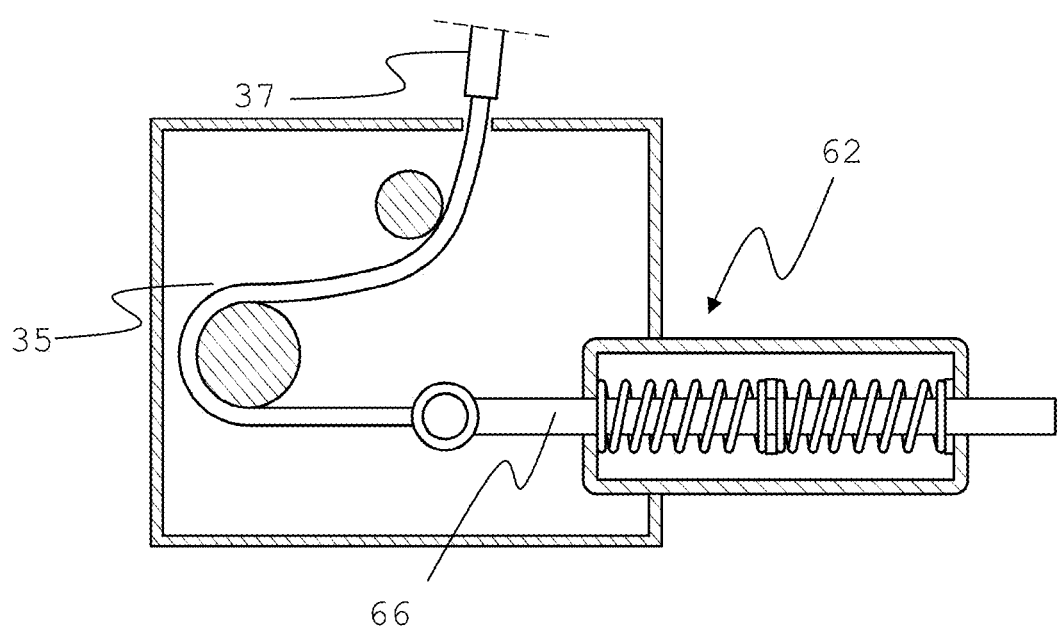
FIG. 13 shows a schematical cross-sectional view of latch-controlling means of FIG. 12.

Additionally, as shown in FIG. 12, the handle (30) further includes a latch-controlling means (34). The latch-controlling means (34) includes a braking mechanism similar to that of either cantilever brakes found on bicycles or self-locking hand-brakes found on walkers and cable (35) and a sleeve (37). Briefly, the latch-controlling means (34) is positioned on the handle (30), preferably on a top of the handle (30) such that user application of the latch-controlling means (34) coincides with the user lifting movement of the handle (30) when desiring to decouple the first coupler (52) from either the first or second bar (21, 22) with which the first coupler (52) is coupled. The cable (35) is either exposed to the environment or lying within the sleeve (37), or both. As shown in FIG. 13, the cable (35) connects to the pin (66) of the latch (62). An actuation of the latch-controlling means (34) by the user (mimicking the hand motion of using a bicycle brake) causes a displacement of the cable (35) that leads to a displacement of the pin (66) of the latch (62) in a direction opposite of the first coupler (52). The displacement of the pin (66) of the latch (62) allows the user to decouple the first coupler (52) from either the first bar (21) or second bar (22) with which the first coupler (52) is coupled that allows the basket (40) to detach from the body (10) of the cart (100).

Figure 14:
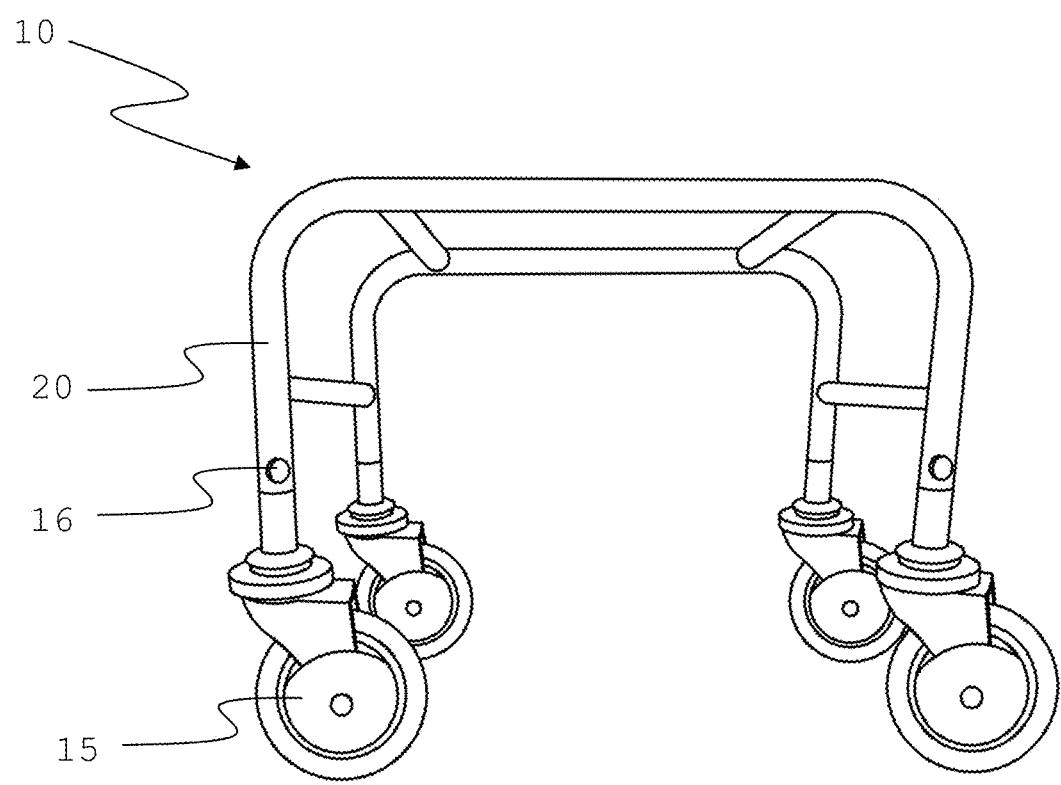
FIG. 14 shows a perspective view of the body of the cart.

As shown in FIG. 14, the caster (15) of the cart removably couples with the frame (20) via a push-button (16) such that the caster (15) is constructed to be attachable to or detachable from the frame (20). Alternatively, this push-button (16) mechanism can also be used to control telescoping of a portion of the frame (20) that lies towards its corresponding caster (15). In this embodiment, the frame's (20) height can be adjustable to suit the user's needs with respect to a particular job the user intends for the cart (100), or even for cart storage purposes (100). Alternatively, as shown in FIG. 15, the caster (15) couples with the frame (20) via a rotatable hinge (17) such that the caster (15) folds underneath the frame (20) for convenient storage of the cart. There is no limit to the number of bars (21, 22), frame members (26, 27), or casters (15), as they can be added or subtracted depending upon the task set out for the cart (100). Although, preferably, the number of casters (15) is four, the number of frame members is two, and the number of bars is four as shown in FIG. 5B.

Figure 17:
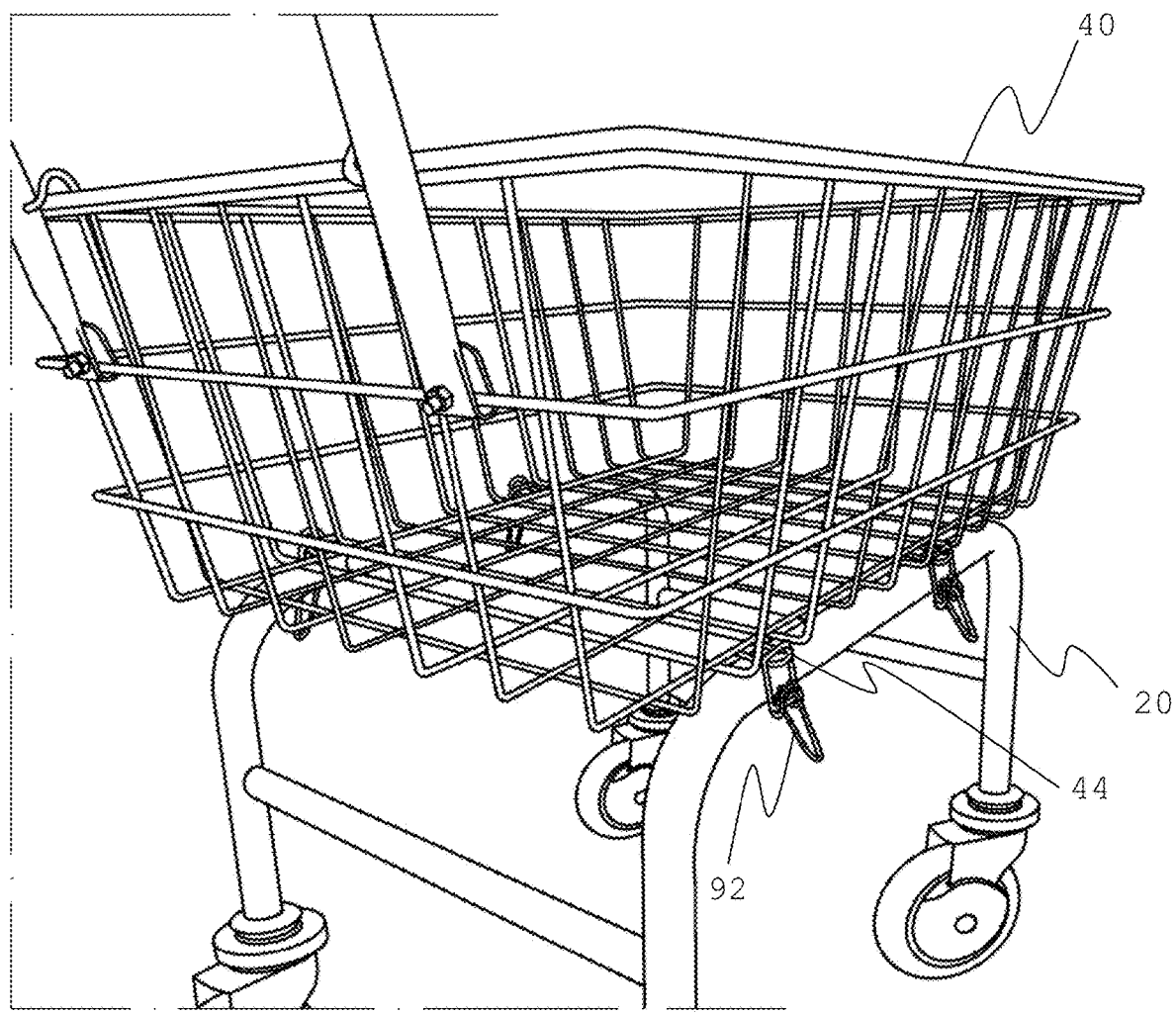
FIG. 17 shows a partial perspective view of the cart.

Additionally, a clamping means (90) for both embodiments of the cart (100), as shown in FIGS. 16A, 16B, and 17, is constructed to detachably couple the basket (40) to the body (10) either as an alternative to the use of the first and second couplers (52, 54) described above or as an additional mechanism to detachably couple the basket (40) to the body (10) together with the first and second couplers (52, 54). As shown in FIG. 16A, the clamping means (90) can be a clamp (90) having an attachment portion (92) and a clamping portion (94) wherein the attachment portion (92) is constructed to be attached (rotatably or statically) to the body of the cart and the clamping portion (94) is fastened onto the basket. Preferably, the clamping portion (94) is a series of alternating hooks (941) (substantially curved or turned about a right angle) with clamping-bar portions (941) at the terminal ends of the clamping portion (94) as shown in FIG. 16B, the latter to clamp down on the first and second couplers (52, 54). The attachment portion (92), as shown in FIG. 16A, ties down the clamping portion (94) to the body (10). The alternating hooks (941) are directed into an interior portion of basket (40) through gaps formed by a mesh (42)

of the basket (40) (e.g. the wire-frame mesh of the basket (40) and the like) and reversibly clamps down on the wire-frame mesh (42) of the basket (40) such that the clamping means (90) reversibly couples and reversibly locks the basket (40) to the body (10) of the cart as shown in FIGS. 16A and 16B. Each of the first and second frame members (26, 27) of the frame (20) has a single clamping means wherein each clamping means (94) preferably includes one clamping portion (94) and two or more attachment portions (92) wherein the attachment portions (92) associate with the clamping means (94). Alternatively, the clamping means (94) above further includes a latch that rotates downward to reversibly couple with the attachment portion (92), thus reversibly locking the basket (40) to the body (10).

As shown in FIG. 17, an alternative clamping means (90) are clamps (92) typically used for hermetic sealing known in the art that are constructed to be attached to either the first or second frame members (26, 27). The basket (40) in this embodiment further includes clamp members (44) constructed to interact with the clamping means (90). The clamping means (90) rotate about either the first or second frame members (26, 27) and the clamping means (90) reversibly clamps down onto the clamp members (44) of the basket (40). Preferably in this embodiment, each of the first and second frame members (26, 27) includes two clamping means (90) and the basket (40) includes four clamp members (44): two clamp members (44) on one side of the basket (40) that is sits atop the first frame member (26) and two clamp members (44) members on the opposite side of the basket (40) that sits atop the second frame member (27). Likewise, each of the first and second frame members (26, 27) includes two clamping means (90) and the basket (40) includes four clamp members (44): two clamp members (44) on one side of the basket (40) that is sits atop the second frame member (27) and two clamp members (44) members on the opposite side of the basket (40) that sits atop the first frame member (26). Alternatively, the cart (100) may have more than four clamp members (44) in total.

Additionally and alternatively, the cart (100) of both embodiments further includes a solar-powered system that moves the latch into an open position such that the basket can be detached from the body of the cart. More specifically, light is provided onto a solar array panel that in turn generates electricity to power a motorized device. Upon user initiation of the solar powered motorized device, including but not limited to a button implementation for initiation of the solar powered motorized device, the powered motorized device causes the latch pin to move, or be displaced, away from the hole of either the first bar and/or the second bar and away from the hole of the first coupler and/or second coupler such that the pin of the latch is outside and no longer traversing the aforementioned holes. In such a state, the user can now easily and conveniently detach the basket from the body. Alternative forms of power to the solar array panel to power the motorized device include, but are not limited to, rechargeable batteries, non-rechargeable batteries, hand-powered batteries, and the like.

While the invention has been shown and described with reference to different embodiments thereof, it will be appreciated by those skilled in the art that variations in form, detail, compositions and operation may be made without departing from the spirit and scope of the invention as defined by the accompanying claims.

What is claimed is:

1. A cart (100) comprising:
   a body (10);
   a basket (40);
   first and second bars (21, 22);
   first and second couplers (52, 54) which are constructed to receive in a snug fit either the first and second bars (21, 22) respectively, or the second and first bars (22, 21) respectively; and
   a first latch (62) which reversibly secures the first coupler (52) to either the first bar (21) or the second bar (22),
   wherein the first and second couplers (52, 54) and the first latch (62) are fixedly attached to the basket (40) and the first and second bars (21, 22) are fixedly attached to the body (10), or the first and second couplers (52, 54) and the first latch (62) are fixedly attached to the body (10) and the first and second bars (21, 22) are fixedly attached to the basket (40).

2. The cart (100) of claim 1, wherein the first coupler (52) forms a groove (56) to receive therein at least a portion of either the first bar (21) or the second bar (22), and
   wherein the second coupler (54) forms a groove (58) to receive therein at least the portion of either the second bar (22) or the first bar (21),
   wherein each of the first and second bars (21, 22) includes a hole (23) formed thereon,
   wherein the first latch (62) fastens the first coupler (52) to either the first bar (21) or the second bar (22) by a pin (66), which is constructed to enter into either the hole (53) of the first coupler (52) and the hole (23) of the first bar (21), or the hole (53) of the first coupler (52) and the hole (23) of the second bar (22).

3. The cart (100) of claim 2, wherein the first and second couplers (52, 54) and the first latch (62) are fixedly attached to a bottom of the basket (40) and the first and second bars (21, 22) are fixedly attached to the body (10), and
   wherein the pin (66) of the first latch (62) has a latch handle (660) which is located close to a side of the basket (40) for easy pulling of the pin (66) such that a user uses a hand to pull the pin and push the side of the basket (40), and
   wherein the latch handle (660) is substantially "L"-shaped.

4. The cart (100) of claim 3, further comprising a handle (30) rotatably attached to the basket,
   wherein the handle (30) includes a rotatable clamp (32), which is constructed to reversibly secure the handle (30) to the basket (40).

5. The cart (100) of claim 3, further comprising a handle (30), wherein the handle (30) is constructed to telescope to adjust a height of the handle (30).

6. The cart (100) of claim 3, further comprising casters (15) attached to the body (10), and wherein the casters (15) removably couple with the body (10) via a push-button (16) such that the casters (15) are constructed to be attachable to or detachable from the body (10).

7. The cart (100) of claim 3, further comprising casters (15) attached to the body (10), and wherein the casters (15) couple with the body (20) via a rotatable hinge (17) such that the casters (15) fold underneath the body (10).

8. The cart (100) of claim 3, further comprising third and fourth bars (26, 27) wherein the first, second, third and fourth bars (21, 22, 26, 27) form a rectangle,
   wherein the third and fourth bars (26, 27) are constructed to be received in the grooves (56, 58) of the first coupler (52) or the second coupler (54),
   wherein each of the third and forth bars (26, 27) includes a hole formed thereon,
   wherein the first latch (62) fastens the first coupler (52) to either the first bar (21) or the second bar (22) or the third bar (26) or the fourth bar (27) by a pin (66), which is constructed to enter into either the hole (53) of the first coupler (52) and the hole (23) of the first bar (21), or the hole (53) of the first coupler (52) and the hole (23) of the second bar (21), or the hole (53) of the first coupler (52) and the hole of the third bar (26), or the hole (53) of the first coupler (52) and the hole of the fourth bar (27).

9. The cart (100) of claim 2, further comprising a second latch (64) which reversibly secures the second coupler (54) to either the second bar (22) or the first bar (21), and a latch-connecting means (70) comprising a first end (72) attached to the first latch (62) and a second end (74) attached to the second latch (64) such that the first and second latches (62, 64) actuate together.

10. The cart (100) of claim 9, wherein the first and second couplers (52, 54) and the first latch (62) are fixedly attached to a bottom of the basket (40) and the first and second bars (21, 22) are fixedly attached to the body (10), and
wherein the pin (66) of the first latch (62) has a latch handle (660) which is located close to a side of the basket (40) for easy pulling of the pin (66) such that a user uses a hand to pull the pin and push the side of the basket (40), and
wherein the latch handle (660) is substantially "L"-shaped.

11. The cart (100) of claim 9, wherein the first coupler (52) further includes a connecting-hole (55) sized to permit the latch-connecting means (70) to pass therethrough, and
wherein each of the first and second bars (21, 22) further includes a latch-connecting means groove (80) to allow passage of the latch-connecting means (70).

12. The cart (100) of claim 1, wherein the first coupler (52) is curved such that the first coupler (52) is substantially shaped as a turned-"∩" to form a groove (56) to receive either the first bar (21) or the second bar (22),
wherein the groove (56) of the first coupler (52) is directed downwardly,
wherein the second coupler (54) is curved such that the second coupler (54) is substantially shaped as a turned-"∩" to form a groove (58) to receive either the second bar (22) or the first bar (21), and
wherein the groove (58) of the second coupler (54) is directed downwardly.

13. A basket (40) configured to detachably couple to a structure having first and second coupling members (21, 22), the basket (40) comprising:
first and second couplers (52, 54) wherein the first and second couplers (52, 54) are constructed to removably couple with either the first and second coupling members (21, 22) of the structure respectively in a snug fit with each other, or the second and first coupling members (22, 21) of the structure respectively in a snug fit with each other; and
a first latch (62) attached to the basket (40) wherein the first latch (62) reversibly secures the first coupler (52) to either the first coupling member (21) or the second coupling member (22).

14. The basket (40) of claim 13, wherein the first coupler (52) forms a groove (56) to receive therein the first coupling member (21) or the second coupling member (22), and
wherein the second coupler (54) forms a groove (58) to receive therein the second coupling member (22) or the first coupling member (21),
wherein each of the first and coupling members (21, 22) includes a hole (23) formed thereon,
wherein the first latch (62) fastens the first coupler (52) to either the first coupling member (21) or the second coupling member (22) by a pin (66), which is constructed to enter into either the hole (53) of the first coupler (52) and the hole (23) of the first coupling member (21), or the hole (53) of the first coupler (52) and the hole (23) of the second coupling member (22).

15. The basket (40) of claim 14, wherein the first coupler (52) is curved such that the first coupler (52) is substantially shaped as a turned-"∩" to form the groove (56) to receive either the first coupling member (21) or the second coupling member (22),
wherein the groove (56) of the first coupler (52) is directed downwardly,
wherein the second coupler (54) is curved such that the second coupler (54) is substantially shaped as a turned-"∩" to form the groove (58) to receive either the second coupling member (22) or the first coupling member (21), and
wherein the groove (58) of the second coupler (54) is directed downwardly.

16. The basket (40) of claim 15, further comprising a second latch (64) which reversibly secures the second coupler (54) to either the second coupling member (22) or the first coupling member (21), and a latch-connecting means (70) comprising a first end (72) attached to the first latch (62) and a second end (74) attached to the second latch (64) such that the first and second latches (62, 64) actuate together.

17. The basket (40) of claim 13, further comprising a handle (30) rotatably attached to the basket,
wherein the handle (30) includes a rotatable clamp (32), which is constructed to reversibly secure the handle (30) to the basket (40).

18. A cart (100) comprising:
a body (10);
a basket (40);
a first bar (21);
a first coupler (52) which is constructed to receive the first bar (21) in a snug fit; and
a first latch (62) which is constructed to secure the first coupler (52) to the first bar (21),
wherein the first coupler (52) and the first latch (62) are fixedly attached to the basket (40) and the first bar (21) is fixedly attached to the body (10), or the first coupler (52) and the first latch (62) are fixedly attached to the body (10) and the first bar (21) is fixedly attached to the basket (40).

19. The cart (100) of claim 18, wherein the first coupler (52) forms a groove (56) to receive therein at least a portion of the first bar (21),
wherein the first bar (21) includes a hole (23) formed thereon,
wherein a hole (53) is formed on the first coupler (52),
wherein the first latch (62) fastens the first coupler (52) to the first bar (21) by a pin (66) which is constructed to enter into the hole (53) of the first coupler (52) and the hole (23) of the first bar (21).

20. The cart (100) of claim 18, further comprising a second bar (22) wherein the second bar (22) is constructed as such at least a portion of the second bar (22) is received in the groove (56) of the first coupler (52),
wherein the second bar (22) includes a hole (23) formed thereon,
wherein the first latch (62) fastens the first coupler (52) to either the first bar (21) or the second bar (22) by a pin (66), which is constructed to enter into the hole (53) of the first coupler (52) and the hole (23) of the first bar (21), or the hole (53) of the first coupler (52) and the hole (23) of the second bar (22).

\* \* \* \* \*